(12) United States Patent
Niiya

(10) Patent No.: US 8,174,664 B2
(45) Date of Patent: May 8, 2012

(54) MULTILAYER SUBSTRATE

(75) Inventor: Hirotaka Niiya, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 1205 days.

(21) Appl. No.: 11/665,215

(22) PCT Filed: Aug. 17, 2005

(86) PCT No.: PCT/JP2005/015019
§ 371 (c)(1),
(2), (4) Date: Apr. 12, 2007

(87) PCT Pub. No.: WO2006/040877
PCT Pub. Date: Apr. 20, 2006

(65) Prior Publication Data
US 2008/0137015 A1    Jun. 12, 2008

(30) Foreign Application Priority Data

Oct. 14, 2004    (JP) .................................. 2004-300475

(51) Int. Cl.
*G02F 1/1339*    (2006.01)

(52) U.S. Cl. ........................................................ 349/155

(58) Field of Classification Search ........... 349/155–157
See application file for complete search history.

(56) References Cited

U.S. PATENT DOCUMENTS

| | | | | |
|---|---|---|---|---|
| 6,144,435 A * | 11/2000 | Yokoyama et al. | ............ | 349/133 |
| 6,617,772 B1 * | 9/2003 | Barton et al. | ................. | 313/292 |
| 6,781,663 B2 * | 8/2004 | Freeman | ........................ | 349/155 |
| 6,927,824 B1 | 8/2005 | Takeda et al. | | |
| 7,136,140 B1 | 11/2006 | Inoue et al. | | |
| 7,375,776 B2 * | 5/2008 | Yeh et al. | ........................ | 349/106 |
| 2003/0202146 A1 | 10/2003 | Takeda et al. | | |
| 2004/0046915 A1 | 3/2004 | Takeda et al. | | |
| 2004/0075798 A1 | 4/2004 | Inoue et al. | | |
| 2004/0114090 A1 * | 6/2004 | Washizawa et al. | .......... | 349/158 |
| 2004/0169806 A1 | 9/2004 | Takeda et al. | | |
| 2005/0018119 A1 | 1/2005 | Takeda et al. | | |
| 2005/0275772 A1 * | 12/2005 | Oya et al. | ........................ | 349/113 |
| 2006/0092366 A1 | 5/2006 | Inoue et al. | | |
| 2006/0098151 A1 | 5/2006 | Inoue et al. | | |
| 2006/0262261 A1 | 11/2006 | Takeda et al. | | |

FOREIGN PATENT DOCUMENTS

| | | |
|---|---|---|
| JP | 57-58124 A | 4/1982 |
| JP | 5-303102 A | 11/1993 |
| JP | 5-333346 A | 12/1993 |
| JP | 11-38420 A | 2/1999 |
| JP | 2000-235188 A | 8/2000 |
| JP | 2001-83517 A | 3/2001 |
| JP | 2001-83522 A | 3/2001 |

(Continued)

*Primary Examiner* — Eric Wong
(74) *Attorney, Agent, or Firm* — Birch, Stewart, Kolasch & Birch, LLP

(57) ABSTRACT

The present invention provides: a multilayer substrate in which a spacer is selectively disposed in a non-display region without reduction in display quality or productivity of a liquid crystal display device; a production method thereof; and a liquid crystal display panel and a liquid crystal display device each using the multilayer substrate or the production method thereof. The multilayer substrate of the present invention is a multilayer substrate comprising a resin interlayer film and an electrode on a substrate in this order, wherein the multilayer substrate has a depression structure including the resin interlayer film in a surface layer, or a depression structure having a rough bottom surface on the resin interlayer film.

14 Claims, 18 Drawing Sheets

FOREIGN PATENT DOCUMENTS

| | | |
|---|---|---|
| JP | 2001-255533 A | 9/2001 |
| JP | 2001-267581 A | 9/2001 |
| JP | 2002-372717 A | 12/2002 |
| JP | 2004-145102 A | 5/2004 |
| WO | WO-97/36205 A1 | 10/1997 |

* cited by examiner (a)

(b)

Fig.3-8
(a)
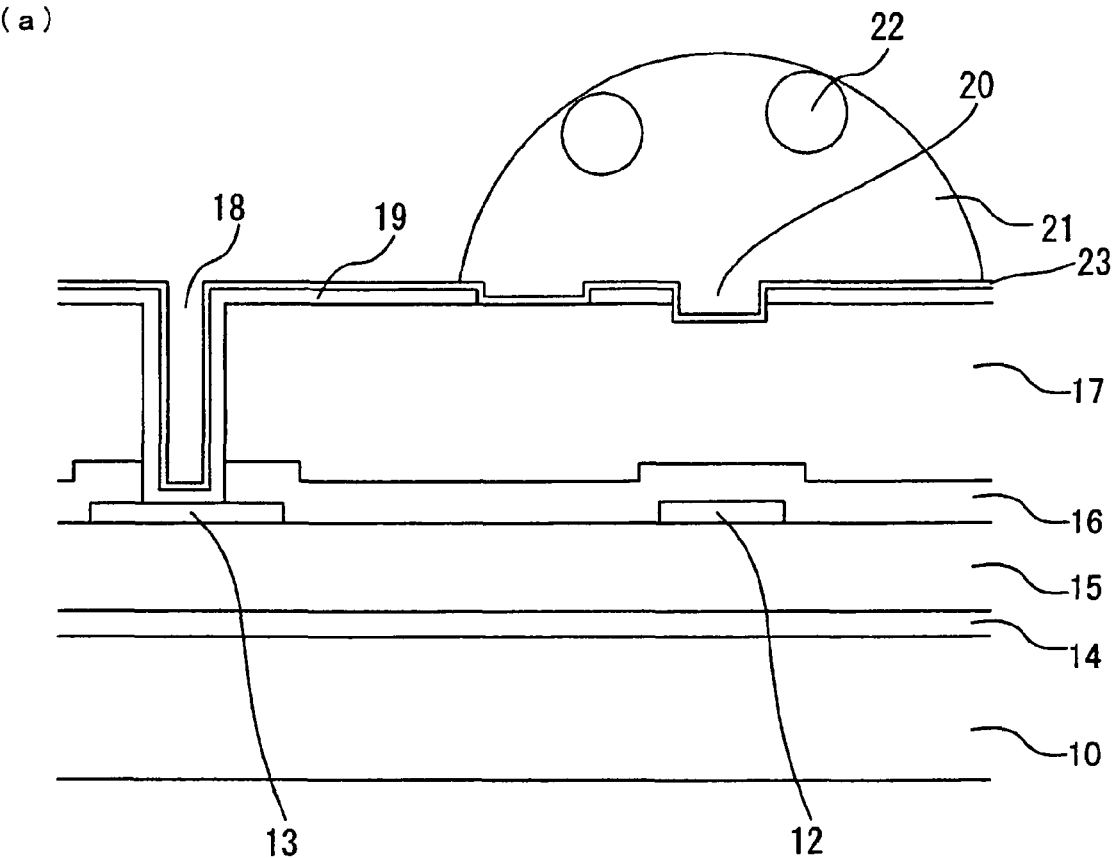
(b)
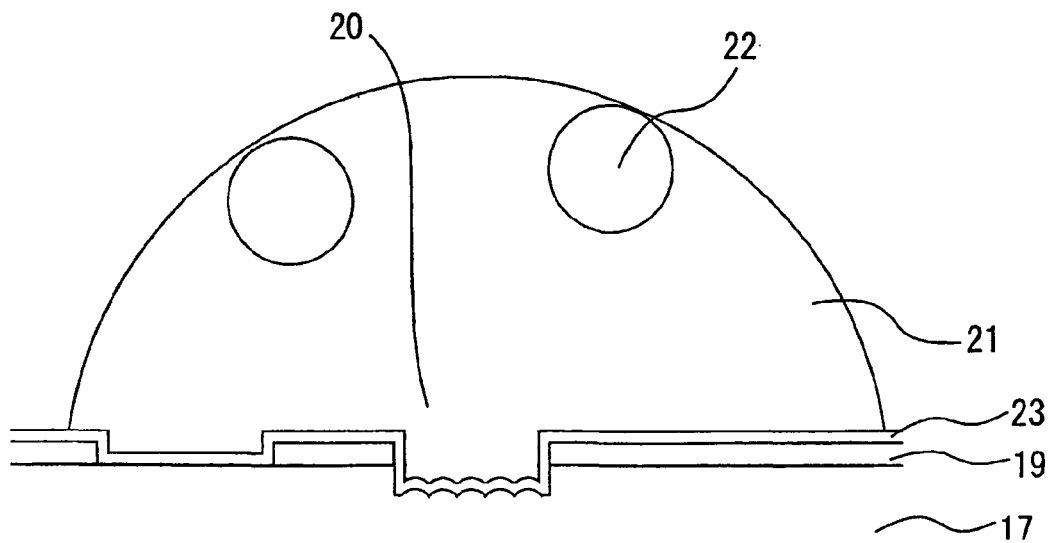

MULTILAYER SUBSTRATE

TECHNICAL FIELD

The present invention relates to multilayer substrates, production methods thereof, liquid crystal display panels, and liquid crystal display devices. More specifically, the present invention relates to a multilayer substrate preferably used in liquid crystal display devices in which improvement in opening ratio is aimed; a production method thereof, and a liquid crystal display panel or a liquid crystal display device each using the multilayer substrate or the production method thereof.

BACKGROUND ART

Liquid crystal display devices are devices performing display by controlling optical characteristics of light emitted from a light source using a liquid material and the like charged into a liquid crystal display panel, and have been widely used in various fields, using features such as slim profile, lightweight, and low power consumption.

The liquid crystal display panel (liquid crystal display element) as a major member of such a liquid crystal display device generally has a structure in which liquid crystal materials are charged between a pair of glass substrates. In order to keep a gap (distance) between the two glass substrates, a spherical spacer mainly made of plastic or an inorganic material is used.

A wet scattering method of spraying a dispersion liquid into which spacers are dispersed and a dry scattering method using inert gas such as nitrogen have been commonly used as a method of disposing the spacers on the substrate. However, in these scattering methods, the spacers are randomly disposed on the substrate surface. Therefore, the spacers are disposed also in a display region, which has an adverse effect on display characteristics.

Accordingly, various methods of disposing spacers only in a non-display region have been investigated. As one of such methods, a technology of forming spacers at an objective position by a photolitho process using a resin material, not by scattering the spherical spacers has been proposed. However, such a resin spacer formed by photolitho process is inferior to the plastic spacer in terms of uniform control of a cell thickness because the resin spacer varies in the thickness direction, in comparison to the plastic spacer and the like. In addition, the formation of the resin spacer using the photolitho process significantly increases costs in comparison to the method of scattering the plastic spacers. In such a respect, there was room for improvement.

A method of selectively disposing spherical spaces in a non-display region has been also investigated. A method of disposing spacers on the entire substrate surface and then removing the spacers disposed in a display region, or a method of printing spacers in a non-display region using a printing method has been proposed, for example (for example, referring to Patent Documents 1 and 2). However, the former method needs an addition step such as a step of removing the spacers in a display region, and in the latter method, a screen for printing gets into contact with a display region subjected to an alignment treatment and thereby alignment of liquid crystal materials are adversely influenced. In such a respect, there was room for improvement.

Methods of scattering a dispersion liquid prepared by dispersing spacers into a dispersion medium or a liquid material for spacers using a ink jet device have been investigated as a method of disposing the spherical spaces only in a non-display region simply and without contact (for example, referring to Patent Documents 3 to 5). However, liquid crystal display devices need to secure a pixel region (display region) which is as large as possible, and a non-pixel region (non-display region) becomes narrower year by year. Therefore, not all of the spacers are disposed inside the non-pixel region actually, even if a high-accuracy ink jet (IJ) device is used. For this problem, it has been proposed that deterioration in display characteristics is suppressed as much as possible even if the spacers enter the pixel region, by coloring the spacers themselves or subjecting the spacer surface to an alignment treatment on the assumption that the spacers are out of the non-pixel region. However, there is concern that such an additional step of treating the spacers themselves increases the price or has an adverse effect on the reliability.

A method of using a depression between electrodes or between colored layers (above a light-shielding layer) has been proposed (for example, referring to Patent Document 6). However, the Patent Document 6 makes no new proposal of formation of such a depression, and a depression generated by pixel formation is mainly used in the same configuration as a previous configuration. Therefore, in this method, it is difficult to perfectly dispose the spacers inside the non-display region.

In addition, the Patent Document 6 proposes that the substrate is directly processed to have a more deep depression, but does not disclose the details. The method of directly processing the substrate may be an effective method for display elements having a simple configuration such as those in passive matrix type. However, sufficient effects can not be obtained in substrates including a switching element such as a thin film transistor (TFT). This is because that, in the TFT array substrate that is a multilayer substrate formed by stacking various films on a glass substrate, even if some irregularities exist on the glass surface, the irregularities are planarized during the stacking process. If the depression on the glass substrate is formed to be larger in view of this planarization, the strength of the glass substrate is reduced. Glass substrates for processing recently become larger, and therefore it is a large disadvantage in terms of yield that the strength of the glass substrates themselves is reduced due to formation of the depression on the substrate.

As liquid crystal display modes other than commonly used TN mode, Multi-domain Vertical Alignment (MVA) display mode and In-Plain Switching (IPS) display mode in which liquid crystals are driven in a lateral direction (in a direction parallel to a substrate surface) have been widely used for improvement in view angle characteristics of liquid crystal display, recently. In the MVA display mode, a linear (rib-shaped) projection structures are formed on a color filter (CF) substrate for alignment control, and slits are provided with pixel electrodes on a TFT substrate for alignment control (for example, referring to Patent Documents 7 and 8). The rib-shaped projection structures on the CF substrate are disposed also in a non-pixel region, and depressions are not formed uniformly, which is different from those on a normal CF substrate. On the TFT substrate, the pixel electrodes have slits, and the slits as well as the region between the pixel electrodes have the depression shape. Therefore, spacers may be disposed not only between the pixel electrodes but also inside the slits. In the IPS display mode, as in the case of the TN mode, it is difficult to dispose every spacer inside the non-display region because of a relationship between ejection accuracy of an IJ device and width of the non-display region.

Accordingly, in the existing substrate configurations, it is difficult to selectively dispose the spacers inside the non-display region.

[Patent Document 1]
Japanese Kokai Publication No. Hei-05-333346
[Patent Document 2]
Japanese Kokai Publication No. Hei-05-303102
[Patent Document 3]
Japanese Kokai Publication No. Sho-57-58124
[Patent Document 4]
WO 97/36205
[Patent Document 5]
Japanese Kokai Publication No. 2002-372717
[Patent Document 6]
Japanese Kokai Publication No. 2004-145102
[Patent Document 7]
Japanese Kokai Publication No. 2001-83517
[Patent Document 8]
Japanese Kokai Publication No. 2001-83522

DISCLOSURE OF INVENTION

The present invention has been made in view of the above-mentioned state of the art. The present invention has an object to provide: a multilayer substrate in which a spacer is selectively disposed in a non-display region without reduction in display quality or productivity of a liquid crystal display device; a production method thereof; and a liquid crystal display panel and a liquid crystal display device each using the multilayer substrate or the production method thereof.

The present inventors have made various investigations on methods of selectively disposing a spacer in a non-display region, and noted a resin interlayer film, which is formed in a thin film transistor array substrate, a color filter substrate, or the like for improvement in opening ratio and planarization. The inventors found that if a depression structure including a resin interlayer film in a surface layer or a depression structure having a rough bottom surface on the resin interlayer film is formed, spacers can be selectively disposed in a non-display region by a simple method using the existing steps, without adverse effects on display quality of liquid crystal display devices. As a result, the above-mentioned problems can be admirably solved, leading to completion of the present invention.

That is, the present invention is (A) a multilayer substrate comprising a resin interlayer film and an electrode on a substrate in this order, wherein the multilayer substrate has a depression structure including the resin interlayer film in a surface layer and/or (B) a multilayer substrate comprising a resin interlayer film and an electrode on a substrate in this order, wherein the multilayer substrate has a depression structure having a rough bottom surface on the resin interlayer film (either or both of these (A) and (B) constitute the present invention).

Preferable embodiments of the multilayer substrate of the present invention include an embodiment in which at least a wiring, a resin interlayer film, and an electrode are formed on a substrate in this order, and an embodiment in which at least a color layer, a resin interlayer film, and an electrode are formed on a substrate in this order. Specifically, the preferable embodiments of the present invention include (1) a multilayer substrate comprising a wiring, a resin interlayer film and an electrode on a substrate in this order, wherein the multilayer substrate has a depression structure including the resin interlayer film in a surface layer; (2) a multilayer substrate comprising a wiring, a resin interlayer film and an electrode on a substrate in this order, wherein the multilayer substrate has a depression structure having a rough bottom surface on the resin interlayer film; (3) a multilayer substrate comprising a color layer, a resin interlayer film, and an electrode on a substrate in this order, wherein the multilayer substrate has a depression structure including the resin interlayer film in a surface layer; (4) a multilayer substrate comprising a color layer, a resin interlayer film and an electrode on a substrate in this order, wherein the multilayer substrate has a depression structure having a rough bottom surface on the resin interlayer film; and combinations of these (1) to (4).

According to the above-mentioned (A) of the present invention, the formation of the depression structure including a resin interlayer film in a surface layer enables spacer-dispersed droplets ejected on the substrate to be more likely to gather inside the depression structure with a large surface area, and thereby the spacers can be selectively disposed. The depth of the depression structure can be secured enough because the depression structure is formed using the resin interlayer film.

According to the above-mentioned (B) of the present invention, the depression structure on the resin interlayer film, which is constituted by a portion where the electrode is not formed, has a depth smaller than that of the depression structure in accordance with the above-mentioned (A) of the present invention. However, by making the bottom surface of the depression structure rough, the effect in which the spacer-dispersed droplets are more likely to gather inside the depression structure can be obtained. In this case, it is preferable that the bottom surface of the depression structure on the resin interlayer film is roughened by roughening the resin interlayer film surface.

In the present invention, the depression structure is not limited only to structures having a depression cross-section as long as it has a depression into which spacers can be disposed. For example, the depression structure may have a U-shaped cross-section, and also may have a V-shaped cross-section as long as the depression structure is in the above-mentioned embodiment (A). The depression structure including the resin interlayer film is constituted by the resin interlayer film and the upper layer thereof. Examples of the upper layer of the resin interlayer film include a pixel electrode and an alignment film in the above-mentioned embodiment (1), and include a common electrode and an alignment film in the above-mentioned embodiment (3).

In the present invention, the resin interlayer film is not especially limited as long as it is an insulating film including a resin. The color layer is generally constituted by colored layers (color filters) of three colors of red, green, and blue, which are formed in each pixel, and a black matrix (BM) partitioning the colored layers. The color number and the color combination of the colored layers are not especially limited.

It is preferable that the multilayer substrate of the above-mentioned (1) and (2) of the present invention is a thin film transistor array substrate. In this case, the resin interlayer film is formed to achieve a high opening ratio. That is, in accordance with the above-mentioned embodiments (1) and (2), the resin interlayer film permits the multilayer structure including the wiring and the electrode, and the wiring and the electrode are formed into different layers. Therefore, a wide electrode area can be secured and a high opening ratio can be permitted.

In the above-mentioned embodiments (1) and (2), a contact hole is generally formed in the resin interlayer insulating film to connect the wiring such as a drain wiring in the TFT to an electrode such as a pixel electrode. The contact hole is formed to penetrate the resin interlayer film, and electrically connects the wiring to the electrode. In the above-mentioned embodiments (1) and (2), the depression structure has part of the resin interlayer film on the bottom side (in the lower layer). Therefore, the depression structure is different in configuration from the contact hole which is formed to penetrate the resin interlayer film.

The multilayer substrate in accordance with the above-mentioned (1) and (2) of the present invention can be produced by the existing production process as it is, if the depression is simultaneously formed when the contact hole is formed in the resin interlayer film. Therefore, such a multilayer substrate hardly needs extra production processes and is also excellent in productivity. If the resin interlayer film has photosensitivity, the contact hole can be formed using photolitho process (exposure and development).

It is preferable that the multilayer substrate of the above-mentioned (3) and (4) of the present invention is a color filter substrate. In this case, the surface of the multilayer substrate can be planarized by forming the resin interlayer film. That is, in the above-mentioned embodiments (3) and (4), the resin interlayer film can planarize the unevenness due to the color layer and protect the color layer surface. In accordance with such embodiments of the present invention, the resin interlayer film as an effective measure for improvement in opening ratio and planarization is used. Therefore, the depression structure can be formed only in a non-display region without a significant change of the production process, and also the spacer can be selectively disposed in the non-display region without reduction in display quality or substrate strength of liquid crystal display devices.

It is preferable in the above-mentioned (A) of the present invention that the depression structure has a depth of 0.05 μm or more and 2.0 μm or less. According to this embodiment, variation in depth can be suppressed and the functional effects of the present invention can be sufficiently exhibited. The lower limit of the depth is more preferably 0.1 μm. The upper limit thereof is more preferably 1.0 μm and still more preferably 0.5 μm. In the present description, the terms "or more" and "or less" mean that the value described is included.

It is preferable in the above-mentioned (A) of the present invention that the depression structure has a rough bottom surface. According to this embodiment, the spacer-dispersed droplet can be more likely to gather inside the depression structure.

Preferred embodiments of the above-mentioned depression structure include an embodiment in which the depression structure is formed in a stripe pattern. In this embodiment, the spacers can be disposed at a uniform distance in the substrate surface, and variation in cell gap can be sufficiently suppressed. In this case, it is preferable that the depression structure formed in a stripe pattern is discontinuously formed. In accordance with an embodiment in which an equally spaced section (separation) is provided with the depression structure formed in a stripe pattern, the spacers can be more selectively disposed.

It is preferable that the depression structure is formed in a light-shielding region (non-display region). In accordance with this embodiment, the spacers can be selectively disposed in the non-display region.

Other configurations of the multilayer substrate of the present invention are not especially limited as long as the multilayer substrate essentially includes the above-mentioned configurations and components which the multilayer substrate generally includes. The multilayer substrate of the present invention is preferably a multilayer substrate used for liquid crystal display devices (multilayer substrate for liquid crystal display devices).

The present invention is also a production method of a multilayer substrate comprising a wiring or a color layer, a resin interlayer film, and an electrode on a substrate in this order, wherein the production method comprises the steps of: forming a depression structure including the resin interlayer film in a surface layer; and coating the depression structure with a liquid material including a spacer using an ejection device. According to such a method, the resin interlayer film as an effective measure for improvement in opening ratio and planarization is used, and the spacers can be selectively disposed in the non-display region without reduction in display quality or substrate strength of liquid crystal display device. In the step of coating the liquid material, the coating may be performed using a droplet that is larger than the depression structure as long as the spacers can be disposed inside the depression structure.

In the present invention, it is preferable that the resin interlayer film includes a photosensitive resin, and the step of forming the depression structure is a step of irradiating a region where the depression structure is formed in the surface layer, with light through a mask provided with a mesh or a slit. According to this embodiment, the depression structure and the contact hole can be formed together by photolitho process. A mask provided with a mesh or a slit (groove) is used to roughen at least the bottom surface of the depression structure, and thereby the spacer-dispersed droplet (liquid material including spacers) can be more likely to gather inside the depression structure.

The present invention also is a production method of a multilayer substrate comprising a wiring or a color layer, a resin interlayer film, and an electrode on a substrate in this order, wherein the production method comprises: a roughening step of roughening part or the whole of a surface of the resin interlayer film; a step of forming a depression structure on the resin interlayer film; and a step of coating the depression structure with a liquid material including a spacer using an ejection device. Also in accordance with such a method, the spacers can be selectively disposed in the non-display region using the resin interlayer film as an effective measure for improvement in opening ratio and planarization, without reduction in display quality or substrate strength of liquid crystal display devices.

In the present invention, it is preferable that the roughening step is performed by a plasma treatment. According to this embodiment, the resin interlayer film surface can be selectively roughened.

It is preferable that the ejection device is an ink jet device. According to this embodiment, an extremely fine droplet of the spacer-dispersed liquid (liquid material including spacers) can be added dropwise on the substrate with accuracy, and therefore the spacers can be disposed with accuracy.

The present invention is also a liquid crystal display panel and a liquid crystal display device each comprising the multilayer substrate of the present invention or a multilayer substrate produced by the production method of the multilayer substrate of the present invention. According to these embodiments, the display quality in the liquid crystal display device can be improved without reduction in productivity. The preferable embodiments of the above-mentioned liquid crystal display panel include an embodiment in which the liquid crystal display panel has a rib-shaped projection for alignment control formed on the multilayer substrate or a substrate opposite to the multilayer substrate. In such an embodiment, the rib-shaped projection for alignment control is generally formed also in the non-display region. Therefore, variation in cell gap is caused if the region where the rib-shaped projection for alignment control is formed is the same as the region where the spacer is disposed. However, even in such an embodiment, variation in cell gap can be effectively prevented because the region where the spacer is disposed can be controlled with high accuracy according to the present invention.

EFFECT OF THE INVENTION

In the multilayer substrate of the present invention, the depression structure or the rough surface is formed using the resin interlayer film effective for improvement in opening ratio and planarization. Therefore, the spacer can be selectively disposed in a non-display region without reduction in display quality or productivity of liquid crystal display devices. As a result, liquid crystal display devices excellent in display quality can be prepared.

BEST MODES FOR CARRYING OUT THE INVENTION

The present invention is mentioned in more detail below with reference to Embodiments, but not limited to only these Embodiments.

Embodiment 1

First, a configuration of a thin film transistor (TFT) array substrate in accordance with Embodiment 1 as one example of the multilayer substrate of the present invention is mentioned.

FIG. 1(a) is a planar view schematically showing a configuration of a TFT array substrate mounted on a liquid crystal display panel, in accordance with one embodiment of the present invention. FIG. 1(b) is an enlarged view schematically showing a region surrounded by the circle (dotted line) of the TFT substrate shown in FIG. 1(a). FIG. 2 is a cross-sectional view schematically showing the TFT array substrate taken along line A-B in FIG. 1(a).

In the TFT array substrate according to the present embodiment, as shown in FIG. 1(a), a gate wiring 11 and a source wiring 12 are disposed to intersect with each other. At the intersection, a TFT as a switching element and an ITO (indium tin oxide) pixel electrode 19 are disposed. The TFT has a bottom gate structure in which a source electrode 12a and a drain electrode 13a are formed above a gate electrode 11a through a gate insulating film 15. In the TFT array substrate in accordance with the present embodiment, a storage capacitance (Cs) wiring 14 is further formed, and as shown in FIG. 2, the Cs wiring 14 faces a drain wiring 13 with the gate insulating film 15 therebetween to form a storage capacitance (Cs). In the region where the Cs wiring 14 is formed, as shown in FIG. 2, the drain wiring 13 is connected to the ITO pixel electrode 19 through a contact hole 18 formed to penetrate a protective film 16 and a resin interlayer insulating film 17.

In the TFT array substrate in accordance with the present embodiment, as shown in FIG. 1(a), an ITO slit for alignment control 19a is formed on an electrode surface in order to control alignment of liquid crystal molecules by generation of electric field in an oblique direction. As shown in FIG. 2, the resin interlayer insulating film 17 is formed between the above-mentioned wirings and the ITO pixel electrode 19 in order to improve the opening ratio by enlargement of the ITO pixel electrode 19 area. Further, as shown in FIG. 2, a depression (depression structure) 20 designed to be deeper than the ITO electrode slit 19a is formed in a non-display region light-shielded by the source wiring 12 (between ITO pixel electrodes 14). Accordingly, using the existing method of ejecting a spacer 22—dispersed liquid by an inkjet (IJ) device, the spacer 22 can be selectively disposed inside the depression 20 positioned in the non-display region, as shown in FIG. 1(a). If the TFT array substrate in accordance with the present Embodiment is used, a liquid crystal display panel with high display quality in which the spacer 22 disposed inside the non-display region at substantially regular distances stably keeps the cell gap (cell thickness) over the entire substrate can be provided.

Then, the TFT array substrate in accordance with the present embodiment and a production method of a liquid crystal display panel using such a TFT array substrate are mentioned below with reference to FIG. 1(a) and FIGS. 3-1 to 3-10.

(1) Production of TFT Array Substrate (1-1) Formation of Gate Wiring 11 (11a) and the Like to Formation of Protective Film 16

The gate wiring 11 (including 11a) and the storage capacitance (Cs) wiring 14 were formed on a glass substrate 10, and thereon, the gate insulating film 15, a semiconductor layer (not shown), the source wiring 12 (including 12a), the drain wiring 13 (including 13a), and the protective film 16 were formed. This formation process is the same as a normal formation process of a thin film transistor (TFT), and therefore the explanation thereof is omitted.

(1-2) Coating of Resin Interlayer Insulating Film 17

FIG. 3-1 is a cross-sectional view schematically showing a step of coating the resin interlayer insulating film 17.

On the TFT substrate after the protective film 16 was formed, the photosensitive resin interlayer insulating film 17 made of acrylic resin was coated to have a thickness of 3.0 μm (FIG. 3-1). The material of the resin interlayer insulating film 17 is preferably photosensitive resin such as acrylic resin, and more preferably a positive photosensitive resin. The film thickness of the resin interlayer insulating film 17 is not especially limited, and is preferably 2.0 μm or more and 5.0 μm or less, and more preferably 3.0 μm or more and 4.0 μm or less.

(1-3) Exposure and Development of Resin Interlayer Insulating Film 17 and Etching of Protective Film FIGS. 3-2 and 3-3 are cross-sectional views schematically showing a step of exposing and developing the resin interlayer insulating film 17 and a step of etching the protective film 16, respectively.

A contact hole 18—formed region of the resin interlayer insulating film 17 was exposed and developed (FIG. 3-2) to form a partial contact hole. A source wiring 12—formed region (positioned between the ITO pixel electrodes 19 later) of the resin interlayer insulating film 17 was exposed and developed (FIG. 3-2) to form the depression 20 for spacer 22 placement (FIG. 3-3). The depression (spacer-disposed position) 20 was formed at a light exposure amount smaller than that for the contact hole portion. This depression 20 may be formed by a method of forming the partial contact hole and the depression 20 for spacer 22 placement simultaneously by adjusting an in-plane light exposure amount using one mask 8 provided with meshes, slits or the like, as in a semi-exposure (half-exposure) process. Alternatively, this depression 20 may be formed by a method of forming the partial contact hole and the depression 20 in different steps using two different masks for forming the partial contact hole and the depression 20.

In the present Embodiment, as shown in FIG. 3-2, the partial contact hole and the depression 20 were simultaneously formed using the mask 8 provided with a specific transmission pattern 8c and a specific mesh pattern 8b so that the contact hole-formed portion was fully exposed and the spacer 22—disposed portion was half exposed. At this time, the depression 20 was linearly formed in a region above the source wiring 12 to have a depth of substantially 0.3 μm and a width of substantially 10 μm. If the depth of the depression 20 is too small, the functional effects of the present invention may not be exhibited, but if it is too large, variation in depth may become larger for the cell thickness.

As in the present Embodiment, the depression 20 surface formed by the half-exposure using the slit pattern or the mesh pattern has a fine unevenness. If the droplet is added dropwise to such a surface, the contact area becomes larger due to the unevenness and therefore a contact angle of a droplet having a contact angle of 90° or less is reduced, in comparison to the contact angle in a flat portion. Therefore, the droplet is much more likely to gather, and as a result, the spacer 22 is selectively disposed inside the depression 20. Because of the same reason, it is preferable that the depression 20 has a rough side surface. The difference in depth between the depression 20 and the ITO slit for alignment control 19a is remarkable, and therefore, the functional effects of the present invention can be sufficiently obtained even if the depression 20 is formed without using the half-exposure process. Through the half-exposure process, the partial contact hole and the depression 20 for spacer placement were formed, and then the protective film 16 at the contact hole 18 portion was etched using the resin interlayer insulating film 17 as a mask (FIG. 3-3).

(1-4) Formation of ITO Pixel Electrode 19

FIG. 3-4 is a cross-sectional view schematically showing a step of forming the ITO film 19'. FIG. 3-5 is a cross-sectional view schematically showing a step of an ITO pixel electrode 19 patterning by photoetching.

The ITO film 19' was formed by a sputtering method (FIG. 3-4), and subjected to photoetching (coating of a resist 9, pre-baking, exposure, development, rinse, post-baking, and the like), and thereby an ITO pixel electrode 19 patterning was performed. As a result, the ITO pixel electrode 19 and the ITO slit for alignment control 19a were completed (FIG. 3-5). In addition, the contact hole 18 connecting the drain wiring 13 to the ITO pixel electrode 19 was completed. The ITO on the depression (spacer-disposed position) 20 surface was also removed at the time of the ITO pixel electrode 19 patterning. At this time, the depression (spacer-disposed position) 20 was deeper than the ITO slit for alignment control 19a portion because the resin interlayer insulating film 17 has a depression. The depth of the ITO slit for alignment control 19a, that is, the film thickness of the ITO film 19' is generally 0.1 to 0.2 μm. The ITO slit for alignment control 19a was formed in such a way that the end and the corner thereof were disposed above the light-shielding region or around above the light-shielding region (FIG. 1(a)).

(1-5) Separation of Resist 9

FIG. 3-6 is a cross-sectional view schematically showing a step of separating the resist 9.

The resist 9 formed in the above-mentioned photoetching step was separated, and thereby the TFT array substrate was completed (FIG. 3-6).

(2) Formation of Alignment Film 23 to Placement of Spacer 22

FIG. 3-7 is a cross-sectional view schematically showing a step of forming an alignment film 23. FIG. 3-8(a) is a cross-sectional view schematically showing a step of ejecting a spacer 22—dispersed liquid. FIG. 3-8(b) is a cross-sectional view schematically showing an enlarged peripheral region of the depression 20 shown in FIG. 3-8(a). FIG. 3-9 is a cross-sectional view schematically showing a step of drying the spacer 22—dispersed liquid.

Alignment films 23 and 43 were formed on the TFT array substrate and a color filter (CF) substrate separately prepared, respectively (FIG. 3-7), and then a dispersion liquid into which the spacer 22 was dispersed was ejected into the depression 20 formed on the TFT array substrate using an ink jet (IJ) device (FIG. 3-8(a)). The ejected amount per droplet was about 60 pl, and a contact angle of the droplet to the alignment film 23 was substantially 50°. In the present Embodiment, the spacer 22—dispersed liquid including plastic beads (diameter: 4.0 μm) as the spacer 22 and ethylene glycol as a dispersion medium 21 was used. The material of the spacer 22 is not limited to plastic bead, and may be glass, silica, and the like. The spacer 22 surface may be subjected to coloring and alignment treatment, and an anchoring layer may be formed thereon. The dispersion medium 21 in the dispersant liquid is not limited to ethylene glycol, and may be appropriately selected depending on the material of the spacer 22. The dispersion medium 21 may be a mixture of a plurality of dispersion mediums. A dispenser device and the like may be used as the ejection device.

The ejected droplet was dried using an oven to evaporate the dispersion medium 21 evaporated, and as a result, only the dispersed spacer 22 remained on the substrate. The difference in depth between the depression 20 and the ITO slit for alignment control 19a is remarkable and the depression 20 has a fine unevenness surface (FIG. 3-8(b)). Therefore, the dispersion medium 21 was dried along the shape of the depression 20. That is, the droplet is more likely to gather in the unevenness portion even on the surface formed of the same material, because the unevenness portion has a surface area larger than that of the flat portion and thereby the contact angle is reduced to be smaller. Therefore, the dispersion medium 21 was evaporated and then the spacer 22 was selectively disposed inside the depression 20 formed between the ITO electrodes 19 (FIG. 3-9).

(3) Attachment of Substrates

FIG. 3-10 is a cross-sectional view schematically showing a configuration of a liquid crystal display panel produced using the TFT array substrate in accordance with Embodiment 1.

The TFT array substrate 100 in which the spacers 22 were selectively disposed inside the depression 20 and a separately prepared CF substrate 300 were attached using a seal member (not shown) and the like, and then liquid crystals 50 were injected in a vacuum to prepare a liquid crystal display panel (liquid crystal display element). Thus-prepared liquid crystal display panel was determined to be excellent in display characteristics because most of the spacers 22 were selectively disposed inside the depressions 20 formed between the pixels.

According to the method of the present Embodiment, the depression 20 could be formed only between the pixel electrodes 19 without additional steps, using the resin interlayer insulating film 17 as an effective measure for high opening ratio. That is, in a normal configuration using the resin interlayer insulating film 17, the contact hole 18 is formed in the interlayer insulating film 17 to connect the pixel electrode 19 to the drain wiring 13. Generally, this contact hole 18 is formed by exposure and development because the resin interlayer insulating film 17 is made of a photosensitive material. In this Embodiment, the depression 20 is formed together with the contact hole 18, and therefore the existing process can be employed as it is and extra processes are hardly needed, which is different from the conventional technologies.

In the present invention, the protective film 16 may be also used for forming the depression 20 if the interlayer insulating film 17 is thin.

In the present Embodiment, the depression 20 is formed in the resin interlayer insulating film 17 at a position corresponding to the region between the pixel electrodes 19. Therefore, the region between the pixel electrodes 19 has a depression deeper than the depression of the slit for alignment control 19a even after formation of the pixel electrode (transparent electrode pattern) 19, which leads to the remarkable difference. This difference in the depth direction enables the spacer 22 to be selectively disposed between the pixel electrodes 19 when the spacer 22—containing droplet was ejected.

In the present Embodiment, the half-exposure process using the mask 8 having meshes or slits and the like is employed to form the depression (spacer-disposed position) 20, which makes it possible to form the fine unevenness inside the depression 20 without additional processes. As a result, the effect in which the droplet is more likely to gather when the spacer 22—containing droplet is ejected could be obtained. In the present Embodiment, the functional effects of the present invention can be sufficiently obtained even if the depression (spacer-disposed position) 20 is formed without using the half-exposure process.

Embodiment 2

A production method of a TFT array substrate in accordance with Embodiment 2 as another embodiment of the multilayer substrate of the present invention is mentioned.
(1) Production of TFT Array Substrate
(1-1) Formation of Gate Wiring 11 (11a) to Formation of Protective Film 16
(1-2) Coating of Resin Interlayer Insulating Film 17
(1-1) and (1-2) are the same as those in Embodiment 1, and therefore the explanation thereof is omitted.
(1-3) Exposure and Development of Resin Interlayer Insulating Film 17 and Etching of Protective Film FIGS. 4-1 and 4-2 are cross-sectional views schematically showing a step of exposing and developing the resin interlayer insulating film 17 and a step of etching the protective film 16, respectively.

The present Embodiment is the same as (1-3) of Embodiment 1, except that only the partial contact hole was formed using a mask 8 having only a specific transmission pattern 8c (FIGS. 4-1 and 4-2).
(1-4) Formation of ITO Pixel Electrode 19

FIG. 4-3 is a cross-sectional view schematically showing a step of forming an ITO film 19'. FIG. 4-4 is a cross-sectional view schematically showing a step of an ITO pixel electrode patterning by photoetching.

The present Embodiment is the same as (1-4) of Embodiment 1, except that the ITO slit for alignment control 19a was not formed in the photoetching step (FIGS. 4-3 and 4-4).
(1-5) Plasma Treatment of Resin Interlayer Insulating Film 17 and Separation of Resist 9

FIG. 4-5 is a cross-sectional view schematically showing a plasma treatment step of the resin interlayer insulating film 17. FIG. 4-6 is a cross-sectional view schematically showing a step of separating the resist 9.

In the present Embodiment, only the resin interlayer insulating film 17 serving as the bottom surface of the depression 20 between the ITO pixel electrodes was subjected to the plasma treatment (FIG. 4-5). Oxygen ($O_2$), nitrogen ($N_2$), argon (Ar), and the like may be used as introduced gas used in the plasma treatment. As a result, the resin interlayer insulating film 17 surface was roughened. Such an unevenness surface has a large contact area with the droplet, and therefore the spacer 22 is selectively disposed inside the depression 20 when the spacer 22—dispersed liquid is ejected. The plasma treatment was performed, and then the resist 9 formed in the above-mentioned photoetching step was separated, and as a result, a TFT array substrate was completed (FIG. 4-6).
(2) Formation of Alignment Film 23 to Placement of Spacer 22
(3) Attachment of Substrates FIG. 4-7 is a cross-sectional view schematically showing a step of forming an alignment film 23. FIGS. 4-8 and 4-9 are cross-sectional views schematically showing a step of ejecting the spacer 22—dispersed liquid and a step of drying the ejected dispersion liquid, respectively.

The (2) and (3) are the same as those in Embodiment 1, and therefore the explanation thereof is omitted.

The liquid crystal display panel prepared in the present Embodiment was also determined to be excellent in display characteristics because most of the spacers 22 were selectively disposed inside the depression 20.

In the present Embodiment, the plasma treatment step of the resin interlayer insulating film 17 was performed and then the step of separating the resist 9 was performed. However, the plasma treatment step (FIG. 5-2) may be performed after the resist separation step (FIG. 5-1).

Embodiment 3

A configuration of a color filter (CF) substrate of Embodiment 3 as one example of the multilayer substrate of the present invention is mentioned.

FIG. 6 is a planar view schematically showing a configuration of a CF substrate mounted on a liquid crystal display panel in accordance with one embodiment of the present invention. FIG. 7 is a cross-sectional view schematically showing the CF substrate taken along line C-D in FIG. 6.

In the CF substrate according to the present embodiment, as shown in FIG. 6, a colored layer (color layer) 31 and a black matrix (BM, color layer) 32 were each disposed on a glass substrate 30 in a stripe pattern, and as shown in FIG. 7, an overcoat layer (resin interlayer film) 37 and an ITO electrode 39 were formed to cover the colored layer 31 and the black matrix 32. As mentioned above, the overcoat layer 37 was formed between the colored layer 31 and the like, and the ITO electrode 39 in order to planarize the CF substrate surface.

In the CF substrate of the present Embodiment, as shown in FIG. 7, the depression (depression structure) 20 was formed in a non-display region above the BM 32. Accordingly, the spacer 22 can be selectively dispersed inside the depression 20 positioned in the non-display region, as shown in FIG. 7, by the existing method of ejecting the spacer 22—dispersed liquid using an IJ device. Using the CF substrate in accordance with the present Embodiment, a liquid crystal display panel with high display quality in which the spacer 22 disposed in the non-display region at substantially regular distances stably keeps the cell gap (cell thickness) over the entire substrate can be provided.

The production methods of the CF substrate of the present Embodiment and the liquid crystal display panel using such a CF substrate are mentioned below with reference to FIGS. 8-1 to 8-9 and FIG. 9.
(1) Production of CF Substrate
(1-1) Formation of BM Pattern 32

FIG. 8-1 is a cross-sectional view schematically showing a step of forming a BM pattern 32.

A stripe-shaped BM 32 was formed on a glass substrate 30 by photolitho process (exposure, development, and the like) using a negative BM resist material. The material and the formation process of the BM 32 are not especially limited in the formation of the BM 32, and the pattern of the BM 32 is not limited to the stripe pattern.

(1-2) Formation of Colored Layer Pattern 31

FIG. 8-2 is a cross-sectional view schematically showing a step of forming a colored layer pattern 31.

After the BM pattern 32 was formed, a colored layer pattern 31 (red layer 31a, green layer 31b, and blue layer 31c) was formed between the BMs 32, as shown in FIG. 8-2, by photolitho process using a negative color resist material. The material and the formation process of the colored layer 31 are not especially limited in the formation of the colored layer 31. The present Embodiment employed three primary colors of light as a color combination of the colors of the colored layer 31. However, the combination is not especially limited to these three colors, and three or more colors may be used. The pattern arrangement of the colored layer 31 is not especially limited, and examples thereof include dot arrangement, stripe arrangement, mosaic arrangement, and delta arrangement.

In the present Embodiment, the BM pattern 32 was formed and then the colored layer pattern 31 was formed, but the formation order may be reversed.

(1-3) Formation of Overcoat Layer (Resin Interlayer Film) 37 and Depression 20

FIG. 8-3 is a cross-sectional view schematically showing a step of coating an overcoat layer 37. FIG. 8-4 is a cross-sectional view schematically showing a step of forming a depression 20.

The colored pattern 31 and the BM pattern 32 are formed, and then an overcoat layer 37 is formed to cover the patters 31 and 32. As a result, the patterns can be planarized. At this time, if a negative photosensitive resin material is used as a material for the overcoat layer 37, the depression 20 for spacer placement can be formed above the BM pattern 32 by backside exposure using the BM pattern 32 as a mask, as shown in FIG. 9. If a positive photosensitive resin material is used, the exposure is performed on the front side using a mask, the depression 20 for spacer placement can be formed above the BM pattern 32. If the latter exposure method is employed, the above-mentioned mask 8 provided with a slit pattern or a mesh pattern is used to form the depression 20 having a fine unevenness bottom surface, as shown in FIG. 8-4. Even if the overcoat layer 37 has no photosensitivity, the etching mask (resist) patterning is performed and then the treatment is performed using a dry etching device and the like. As a result, the depression 20 can be formed or the depression 20 surface can be roughened.

In the present Embodiment, the overcoat layer 37 was formed by coating a positive photosensitive resin material as shown in FIG. 8-3, and then as shown in FIG. 8-4, the depression 20 for spacer placement was formed using a mask 8 having a specific slit pattern 8b for half-exposure of the spacer-disposed portion.

(1-4) Formation of ITO Electrode (Counter Electrode) 39

FIG. 8-5 is a cross-sectional view schematically showing a step of forming an ITO electrode 39.

The colored layer pattern 31, the BM pattern 32 and the overcoat layer 37 were formed, and thereon an ITO electrode 39 was formed by sputtering.

(2) Formation of Alignment Film 34 to Placement of Spacer 22

FIG. 8-6 is a cross-sectional view showing a step of forming an alignment film 43. FIGS. 8-7 and 8-8 are cross-sectional views schematically showing a step of ejecting the spacer 22—dispersed liquid and a step of drying the ejected dispersion liquid, respectively.

As shown in FIG. 8-6, the alignment films 43 and 23 were formed on the CF substrate and a separately prepared TFT array substrate, respectively, and then as shown in FIG. 8-7, the spacer 22—dispersed liquid was ejected into the depression 20 formed on the CF substrate using an inkjet (IJ) device. Then, the droplet was dried using an oven, and thereby the spacer 22 was selectively disposed inside the depression 20, as shown in FIG. 8-8. The details are the same as in (2) of Embodiment 1 and therefore omitted.

(3) Attachment of Substrates

FIG. 8-9 is a cross-sectional view schematically showing a configuration of a liquid crystal display panel produced using the CF substrate of Embodiment 3.

The CF substrate 300 in which the spacer 22 was selectively disposed inside the depression 20 and a separately prepared TFT array substrate 100 were attached using a seal member (not shown) and the like, and then liquid crystals 50 were injected in a vacuum to prepare a liquid crystal display panel (liquid crystal display element).

The liquid crystal display panel prepared in the present Embodiment was also determined to be excellent in display characteristics because most of the spacers 22 were selectively disposed inside the depression 20.

This Nonprovisional application claims priority (under 35 U.S.C. §119(a)) on Patent Application No. 2004-300475 filed in Japan on Oct. 14, 2004, the entire contents of which are hereby incorporated by reference.

BRIEF DESCRIPTION OF DRAWINGS

FIG. 1(a) is a planar view schematically showing a configuration of a TFT array substrate in accordance with Embodiment 1. FIG. 1(b) is across-sectional view schematically showing an enlarged region surrounded by the circle (dotted line) of the TFT array substrate shown in FIG. 1(a).

FIG. 3-2 is a cross-sectional view schematically showing a step of exposing and developing the resin interlayer insulating film 17 in the production steps of the TFT array substrate in accordance with Embodiment 1.

FIG. 3-3 is a cross-sectional view schematically showing a step of etching a protective film 16 in the production steps of the TFT array substrate in accordance with Embodiment 1.

FIG. 3-4 is a cross-sectional view schematically showing a step of forming an ITO deposited film 19' in the production steps of the TFT array substrate in accordance with Embodiment 1.

FIG. 3-5 is a cross-sectional view schematically showing a step of an ITO pixel electrode 19 patterning by photoetching in the production steps of the TFT array substrate in accordance with Embodiment 1.

FIG. 3-6 is a cross-sectional view schematically showing a step of separating a resist 9 in the production steps of the TFT array substrate in accordance with Embodiment 1.

FIG. 3-7 is a cross-sectional view schematically showing a step of forming an alignment film 23 in the production steps of the TFT array substrate in accordance with Embodiment 1.

FIG. 3-8(a) is a cross-sectional view schematically showing a step of ejecting a spacer 22—dispersed liquid in the production steps of the TFT array substrate in accordance with Embodiment 1. FIG. 3-8(b) is a cross-sectional view schematically showing an enlarged peripheral region of the depression 20 shown in FIG. 3-8(a).

FIG. 3-9 is a cross-sectional view schematically showing a step of drying the spacer 22—dispersed liquid in the production steps of the TFT array substrate in accordance with Embodiment 1.

FIG. 3-10 is a cross-sectional view schematically showing a configuration of a liquid crystal display panel produced using the TFT array substrate in accordance with Embodiment 1.

FIG. 4-1 is a cross-sectional view schematically showing a step of exposing and developing a resin interlayer insulating film 17 in production steps of a TFT array substrate in accordance with Embodiment 2.

FIG. 4-2 is a cross-sectional view schematically showing a step of etching a protective film 16 in the production steps of the TFT array substrate in accordance with Embodiment 2.

FIG. 4-3 is a cross-sectional view schematically showing a step of forming an ITO film 19' in the production steps of the TFT array substrate in accordance with Embodiment 2.

FIG. 4-4 is a cross-sectional view schematically showing a step of an ITO pixel electrode patterning by photoetching in the production steps of the TFT array substrate in accordance with Embodiment 2.

FIG. 4-5 is a cross-sectional view schematically showing a step of a plasma treatment of the resin interlayer insulating film 17 in the production steps of the TFT array substrate in accordance with Embodiment 2.

FIG. 4-6 is a cross-sectional view schematically showing a step of separating a resist 9 in the production steps of the TFT array substrate in accordance with Embodiment 2.

FIG. 4-7 is a cross-sectional view schematically showing a step of forming an alignment film 23 in the production steps of the TFT array substrate in accordance with Embodiment 2.

FIG. 4-8 is a cross-sectional view schematically showing a step of ejecting a spacer 22—dispersed liquid in the production steps of the TFT array substrate in accordance with Embodiment 2.

FIG. 4-9 is a cross-sectional view schematically showing a step of drying the spacer 22—dispersed liquid in the production steps of the TFT array substrate in accordance with Embodiment 2.

FIG. 5-1 is a cross-sectional view schematically showing a step of separating the resist 9 in accordance with another example of the production steps of the TFT array substrate in accordance with Embodiment 2.

FIG. 5-2 is a cross-sectional view schematically showing a step of the plasma treatment of the resin interlayer insulating film 17 in accordance with another example of the production steps of the TFT array substrate in accordance with Embodiment 2.

FIG. 6 is a planar view schematically showing a configuration of a color filter (CF) substrate in accordance with Embodiment 3.

FIG. 7 is a cross-sectional view schematically showing the CF substrate taken along line C-D in FIG. 6.

FIG. 8-1 is a cross-sectional view schematically showing a step of forming a BM pattern 32 in production steps of the CF substrate in accordance with Embodiment 3.

FIG. 8-2 is a cross-sectional view schematically showing a step of forming a colored layer pattern 31 in the production steps of the CF substrate in accordance with Embodiment 3.

FIG. 8-3 is a cross-sectional view schematically showing a step of coating an overcoat layer 37 in the production steps of the CF substrate in accordance with Embodiment 3.

FIG. 8-4 is a cross-sectional view schematically showing a step of forming a depression 20 in the production steps of the CF substrate in accordance with Embodiment 3.

FIG. 8-5 is a cross-sectional view schematically showing a step of forming an ITO electrode 39 in the production steps of the CF substrate in accordance with Embodiment 3.

FIG. 8-6 is a cross-sectional view schematically showing a step of forming an alignment film 43 in the production steps of the CF substrate in accordance with Embodiment 3.

FIG. 8-7 is a cross-sectional view schematically showing a step of ejecting a spacer 22—dispersed liquid in the production steps of the CF substrate in accordance with Embodiment 3.

FIG. 8-8 is a cross-sectional view schematically showing a step of drying the spacer 22—dispersed liquid in the production steps of the CF substrate in accordance with Embodiment 3.

FIG. 8-9 is a cross-sectional view schematically showing a configuration of a liquid crystal display panel produced using the CF substrate in accordance with Embodiment 3.

FIG. 9 is a cross-sectional view schematically showing another example of the step of forming the depression 20 in the production steps of the CF substrate in accordance with Embodiment 3.

EXPLANATION OF NUMERALS AND SYMBOLS

Figure 1:
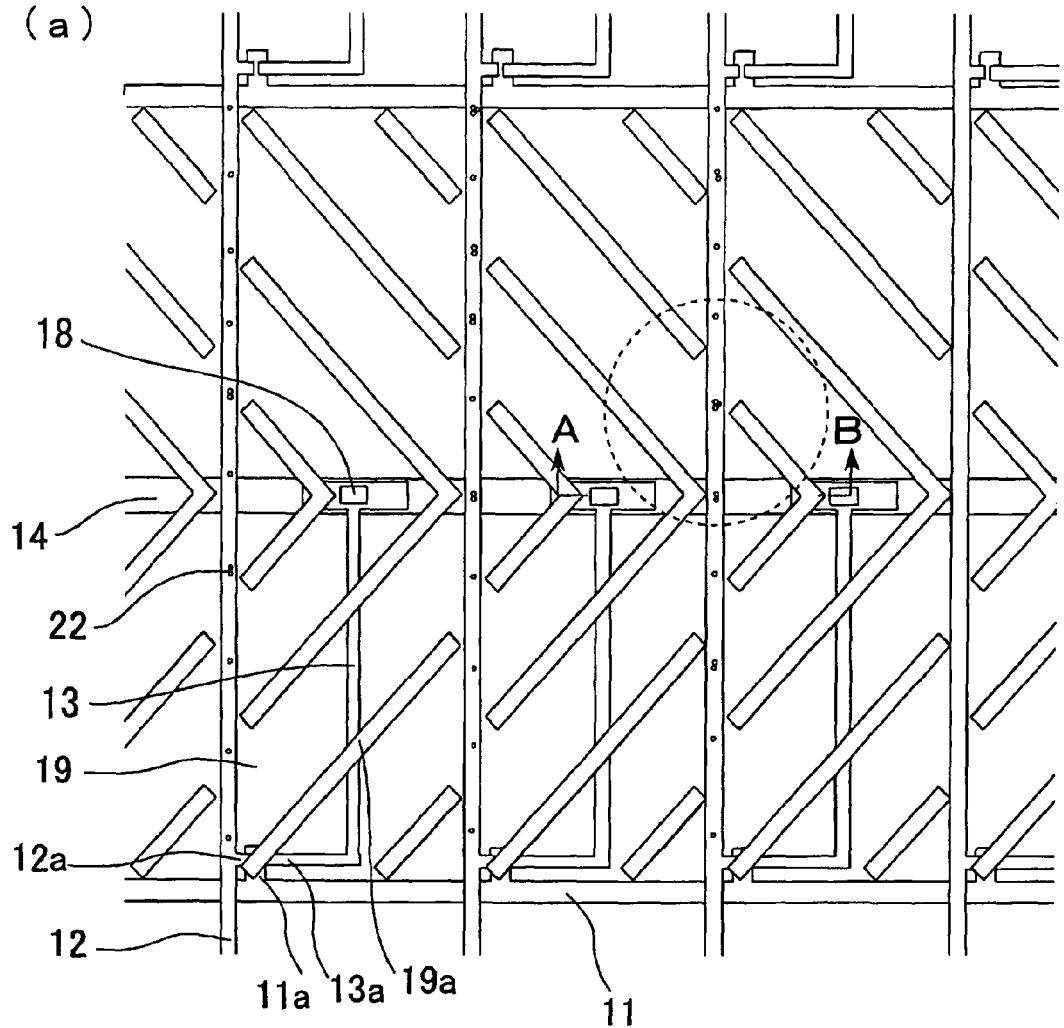
FIG. 3-1 is a cross-sectional view schematically showing a step of coating a resin interlayer insulating film 17 in production steps of the TFT array substrate in accordance with Embodiment 1.
Figure 1:
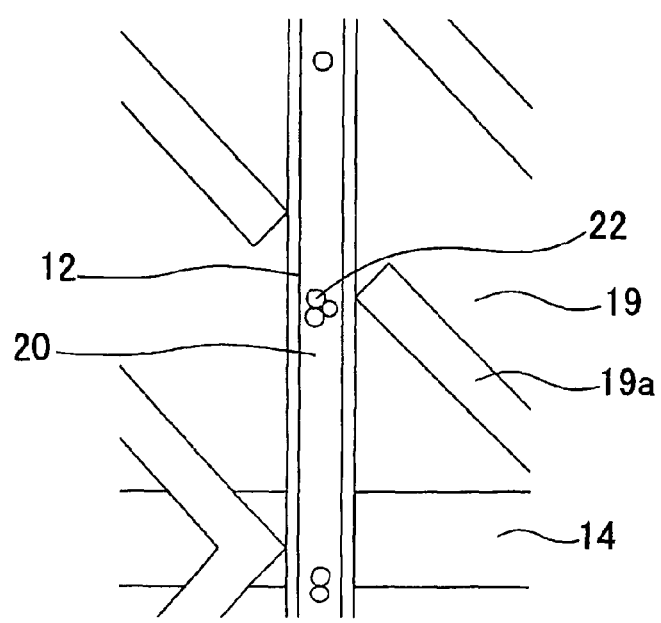
Figure 2:
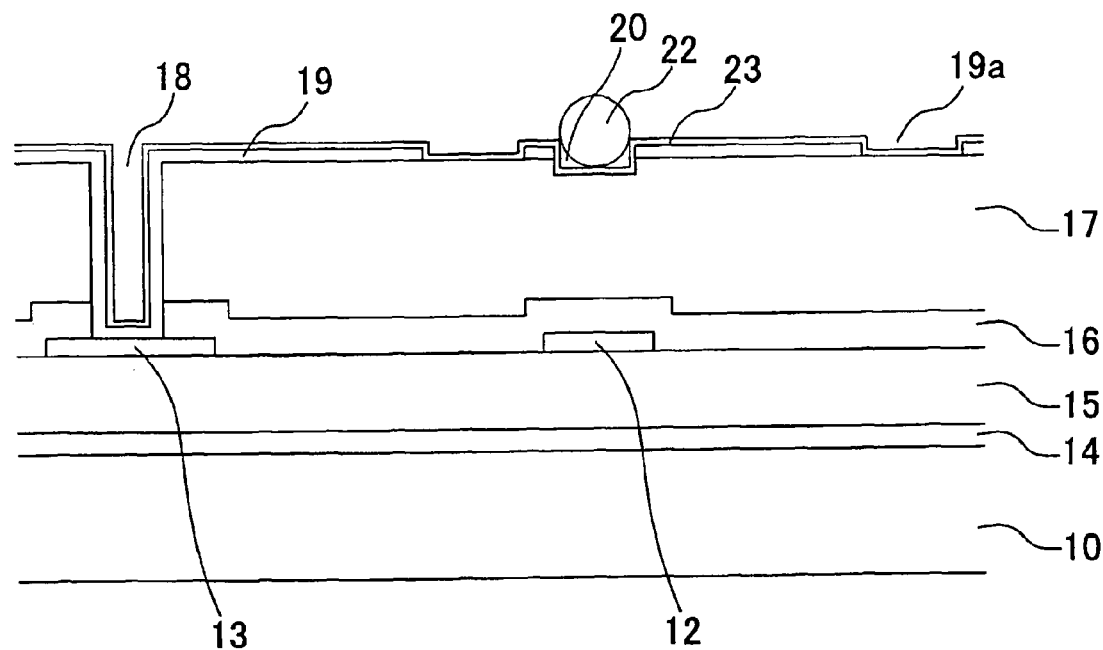
FIG. 2 is a cross-sectional view schematically showing the TFT array substrate taken along line A-B in FIG. 1(a).
Figures 1, 3:
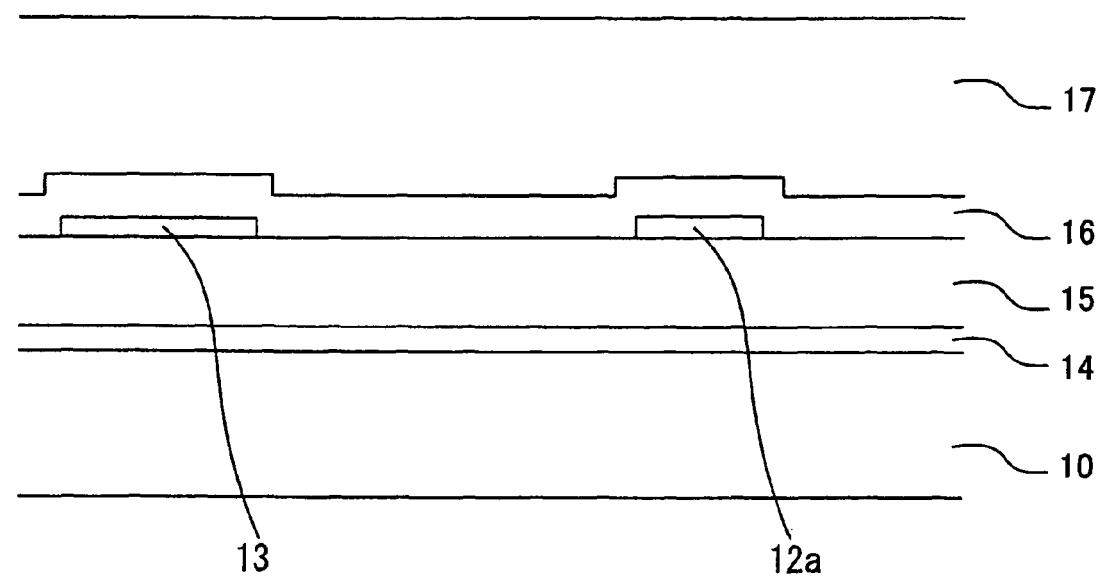
Figures 2, 3:
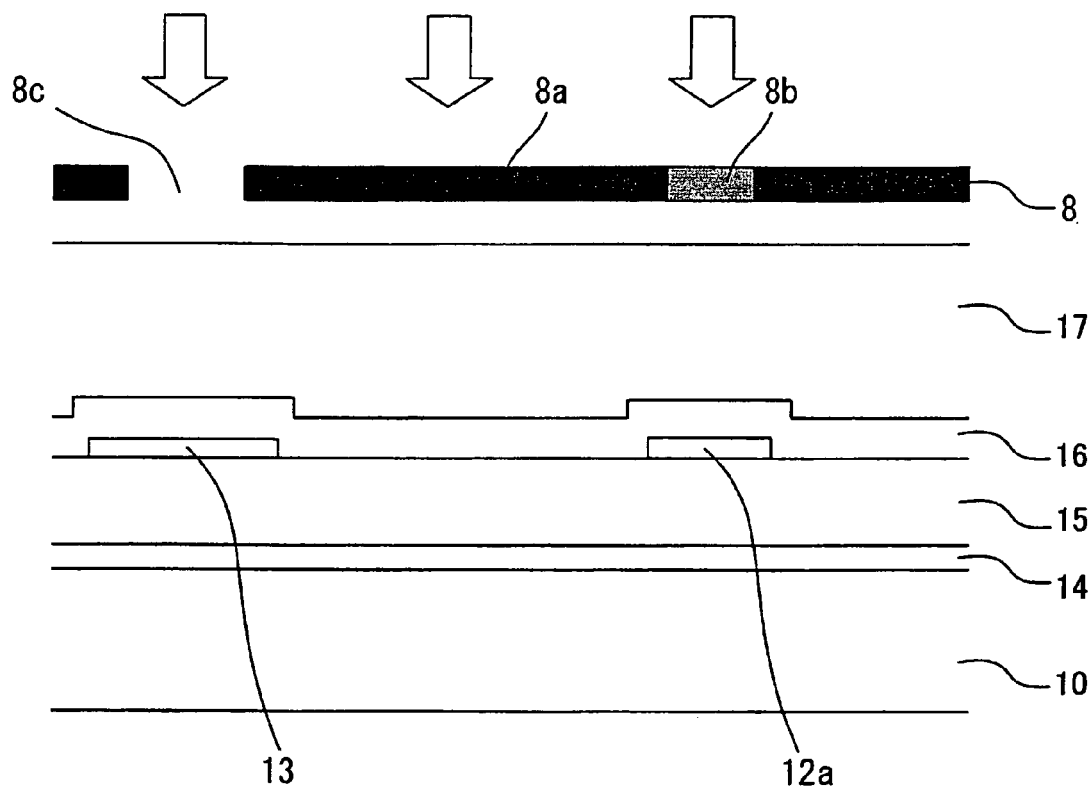
Figure 3:
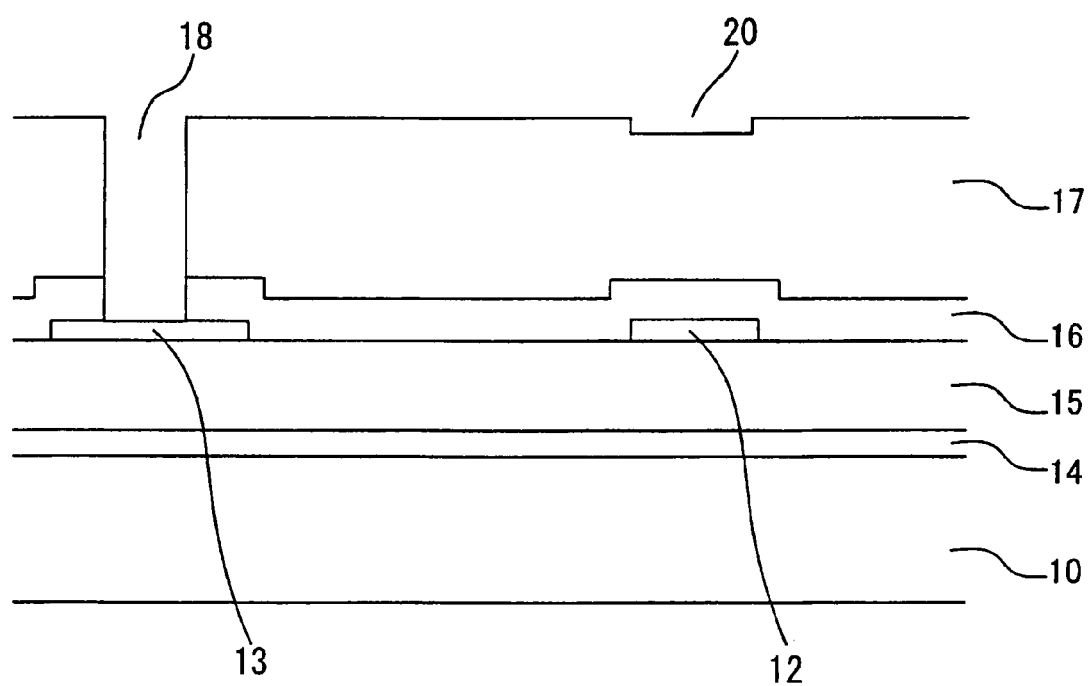
Figures 3, 4:
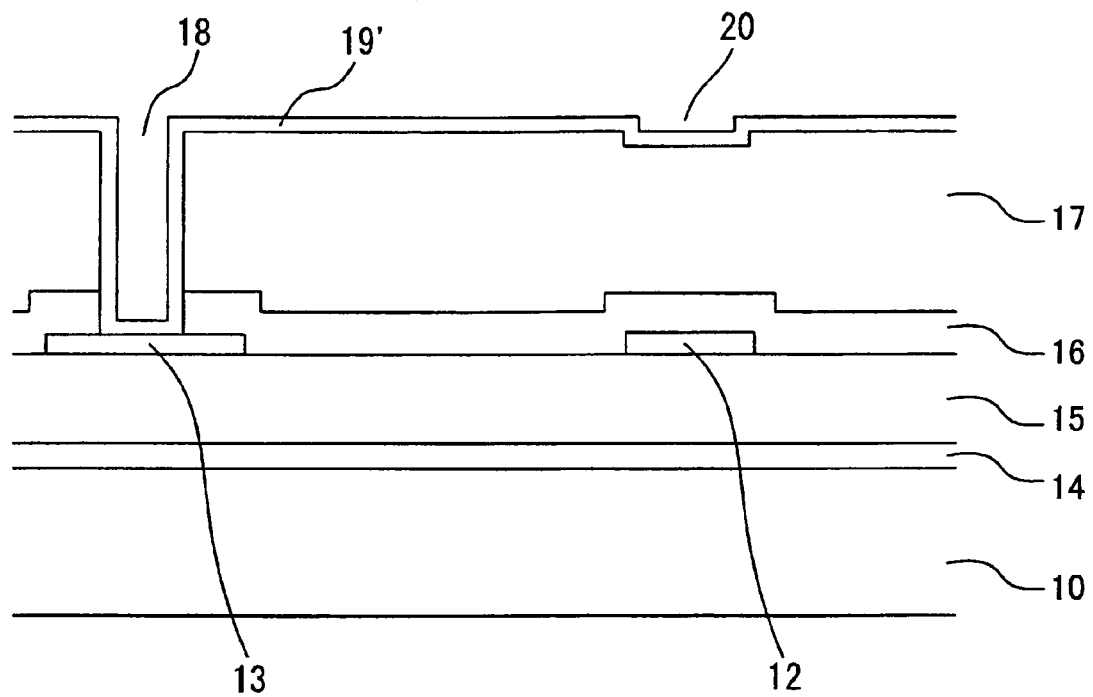
Figures 3, 4, 5:
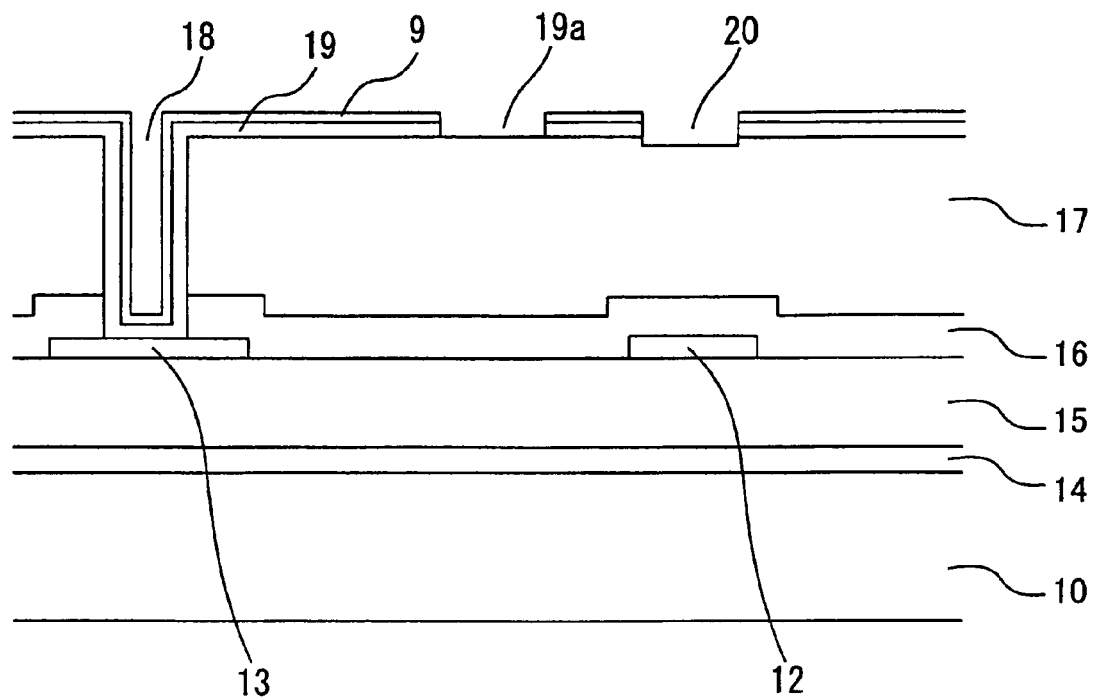
Figures 3, 4, 5, 6:
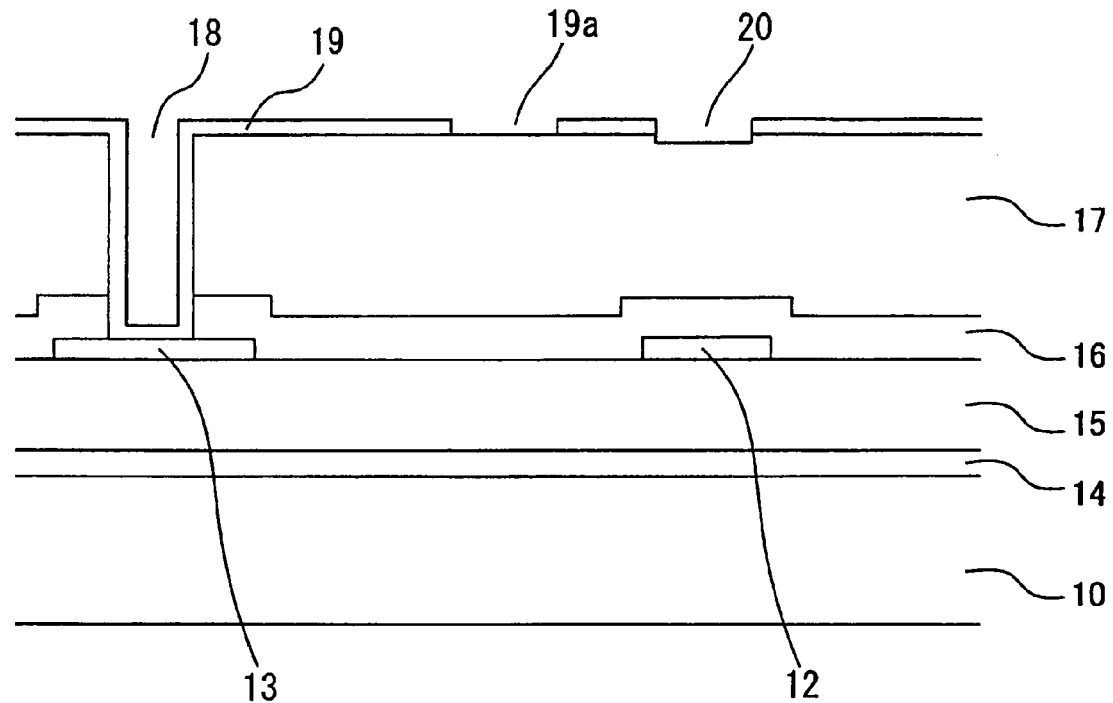
Figures 3, 4, 5, 6, 7:
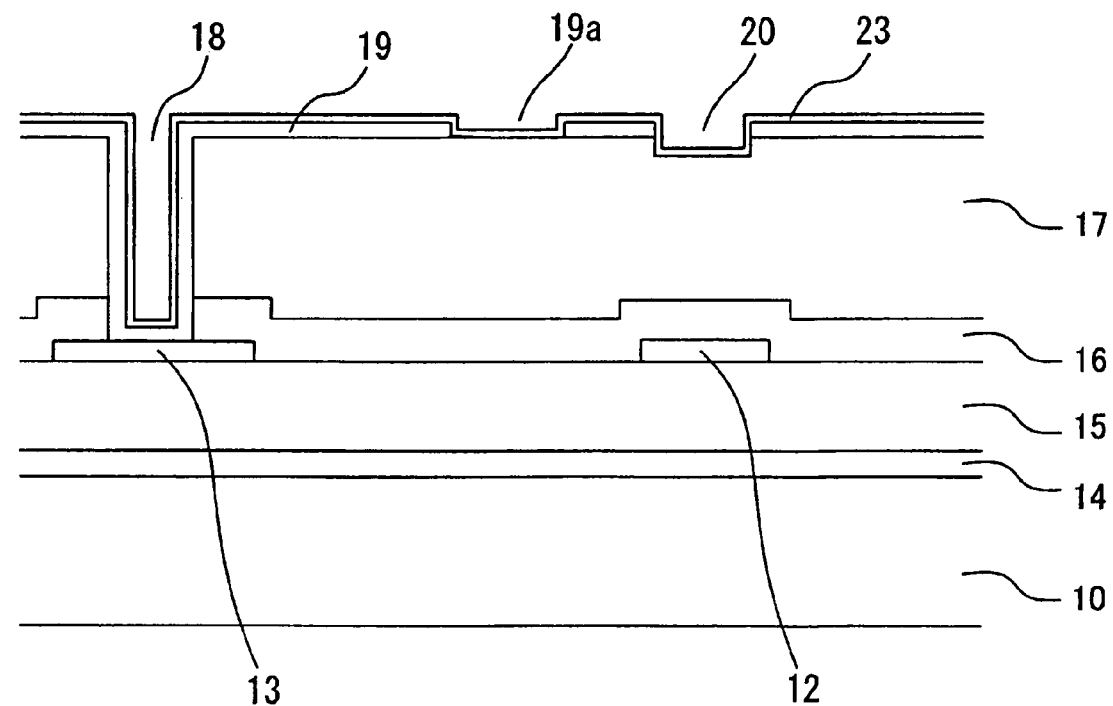
Figures 3, 4, 5, 6, 7, 8, 9:
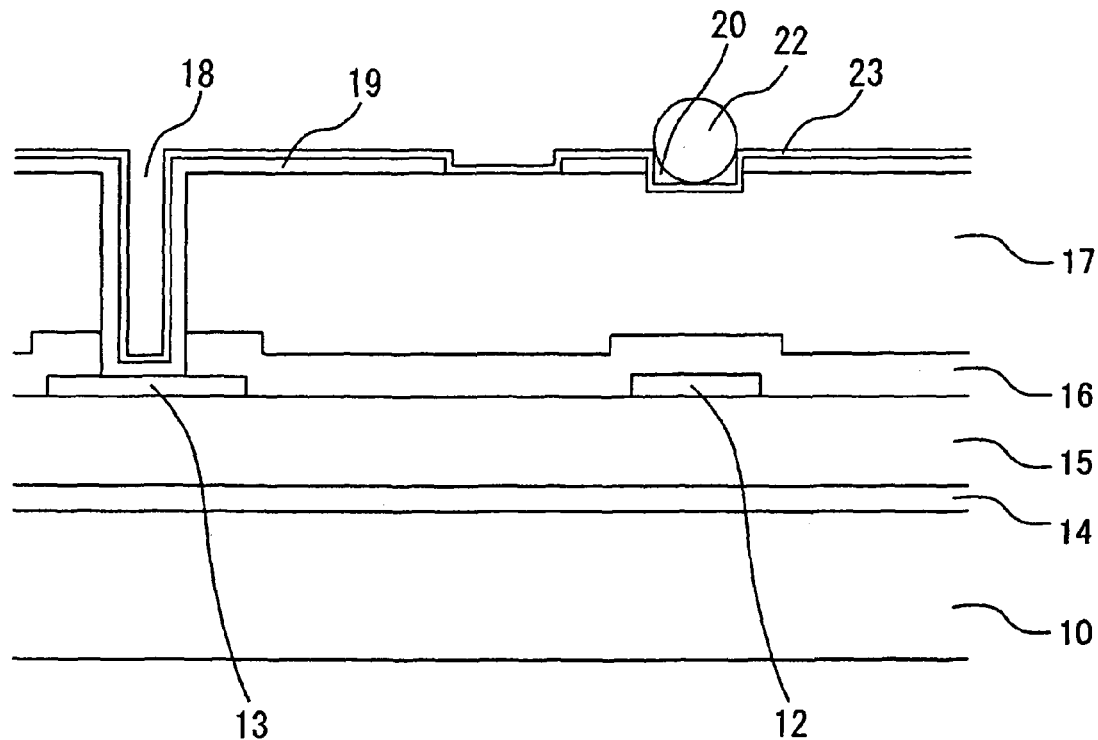
Figures 3, 4, 5, 6, 7, 8, 9, 10:
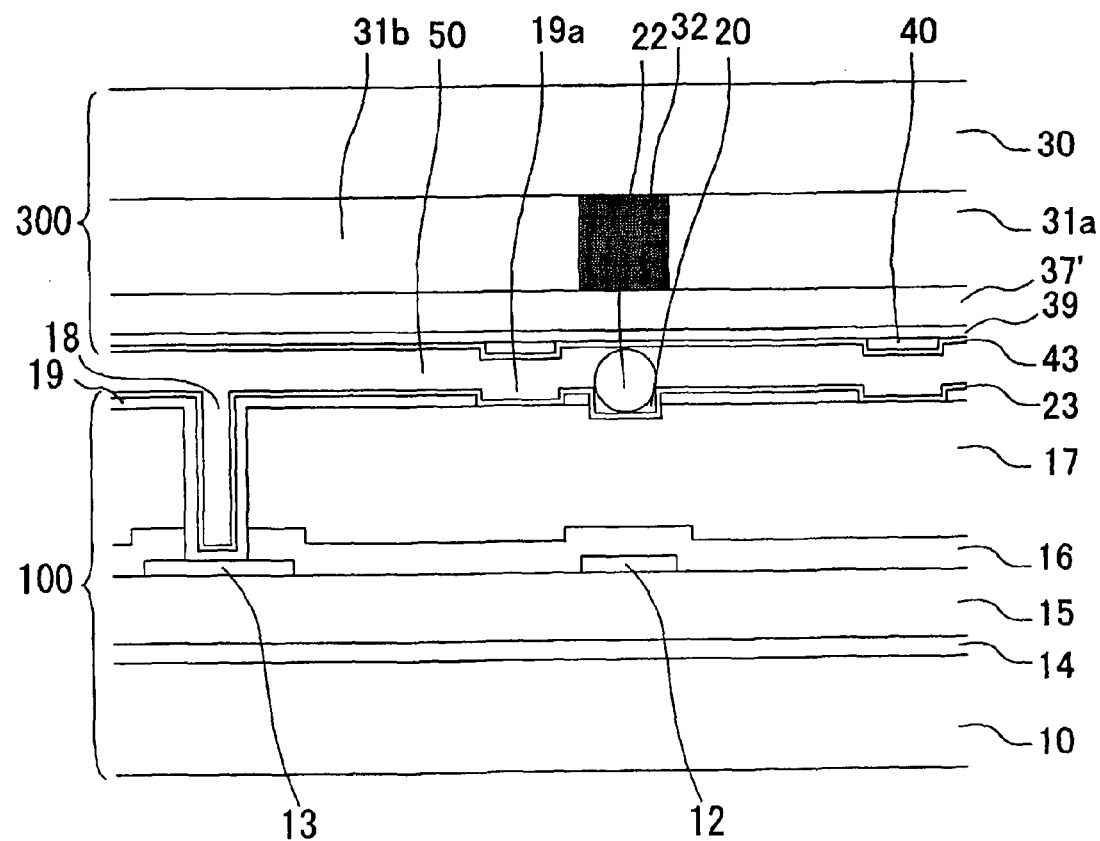
Figures 1, 4:
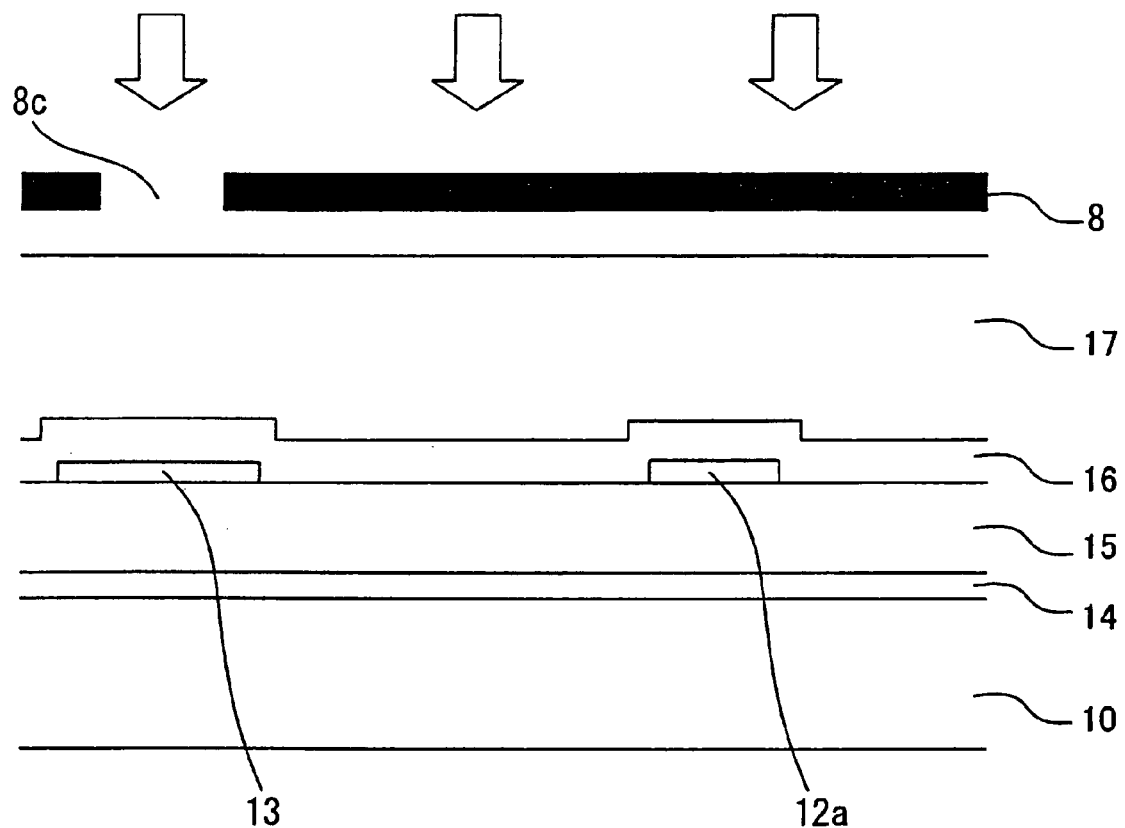
Figures 2, 4:
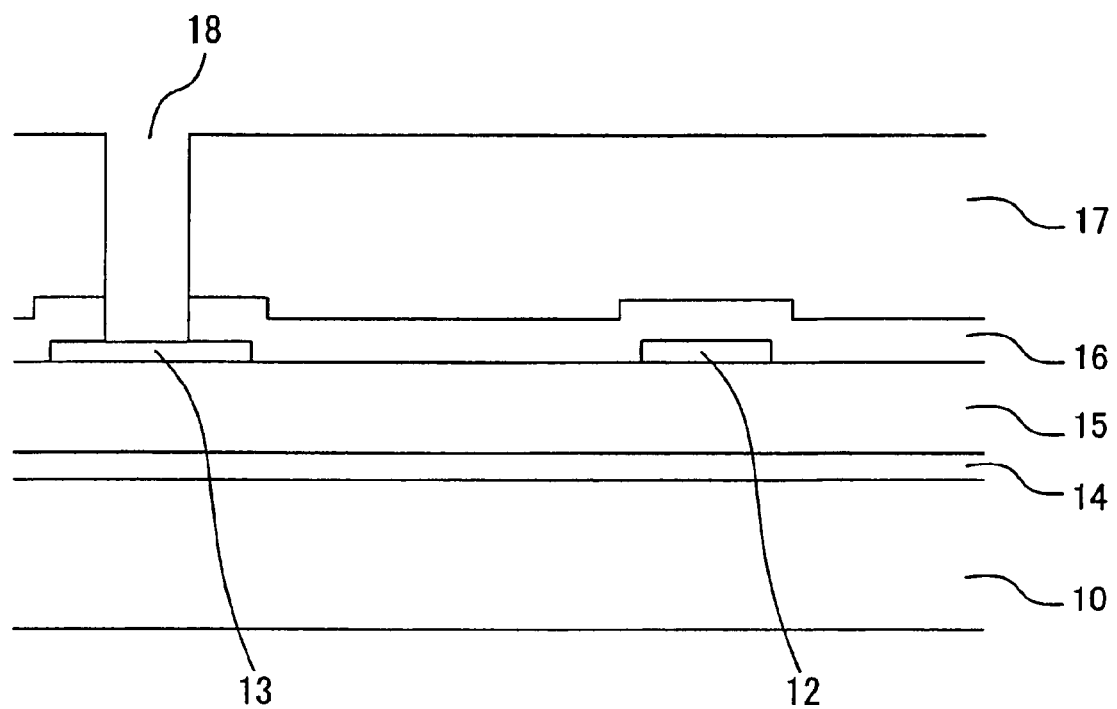
Figures 3, 4:
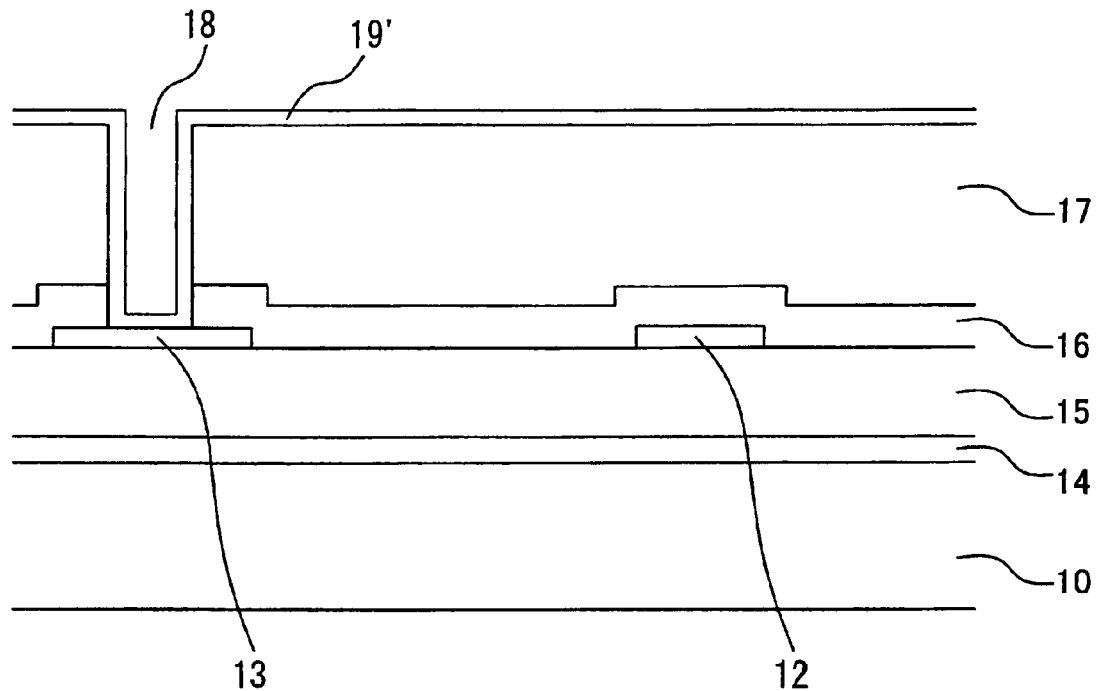
Figure 4:
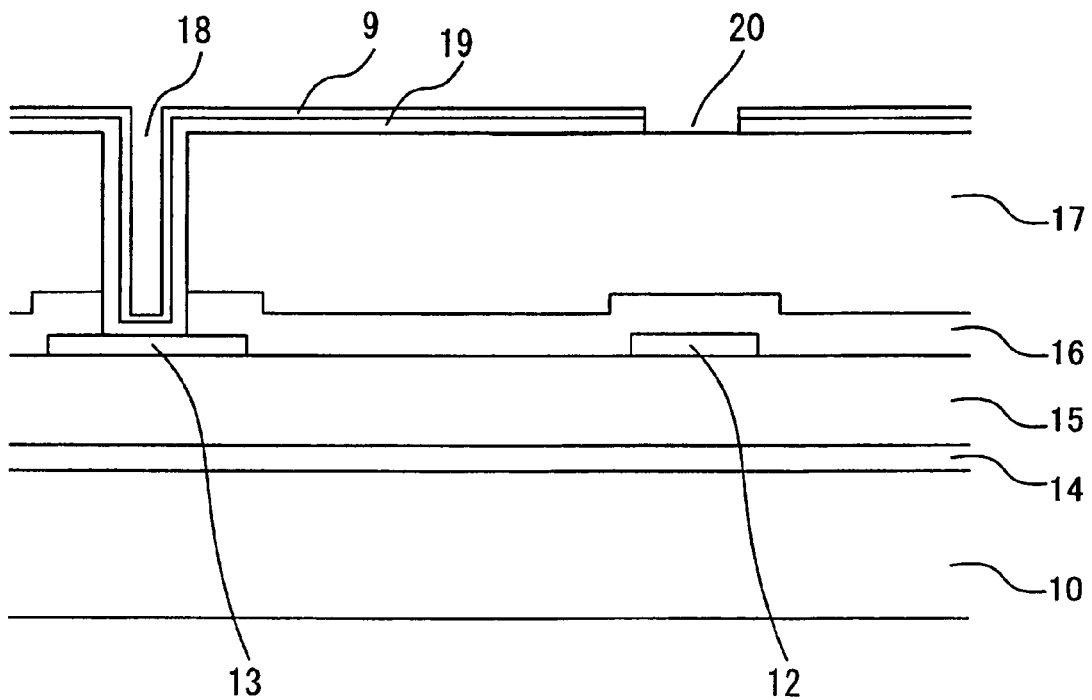
Figures 4, 5:
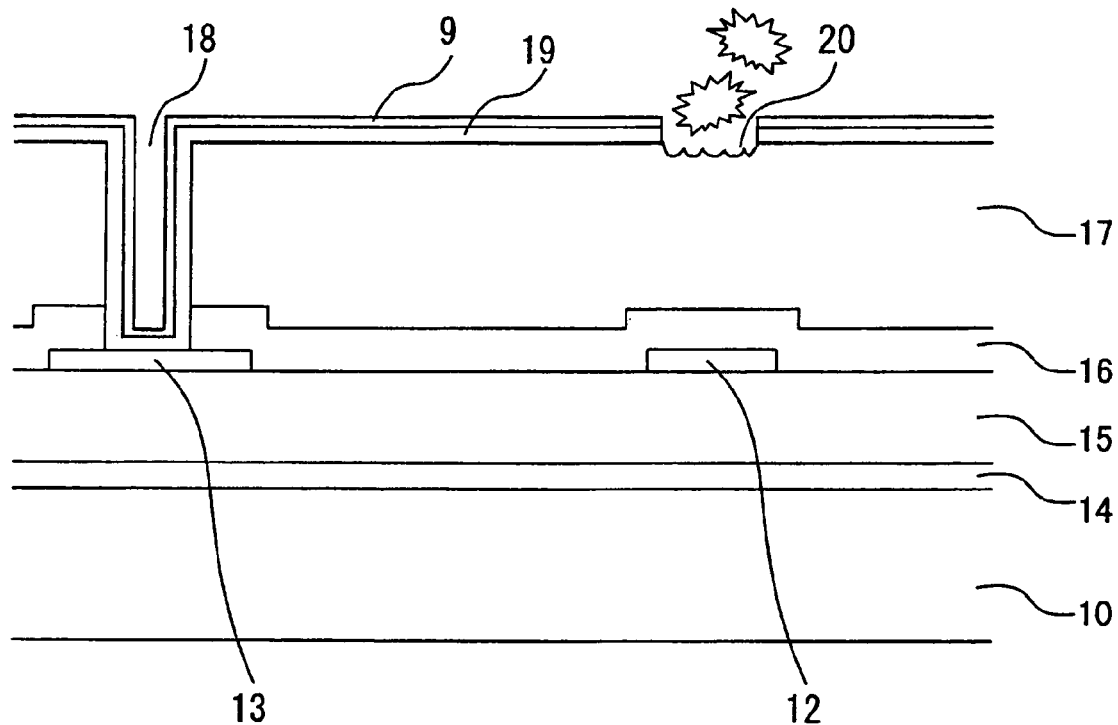
Figures 4, 5, 6:
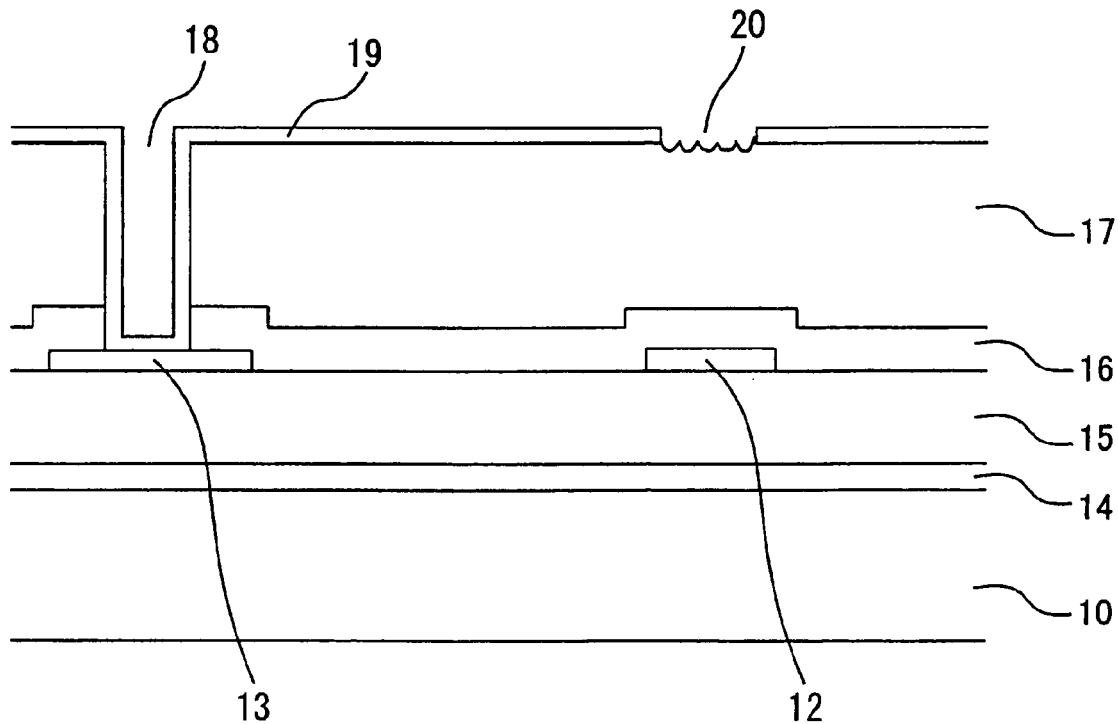
Figures 4, 5, 6, 7:
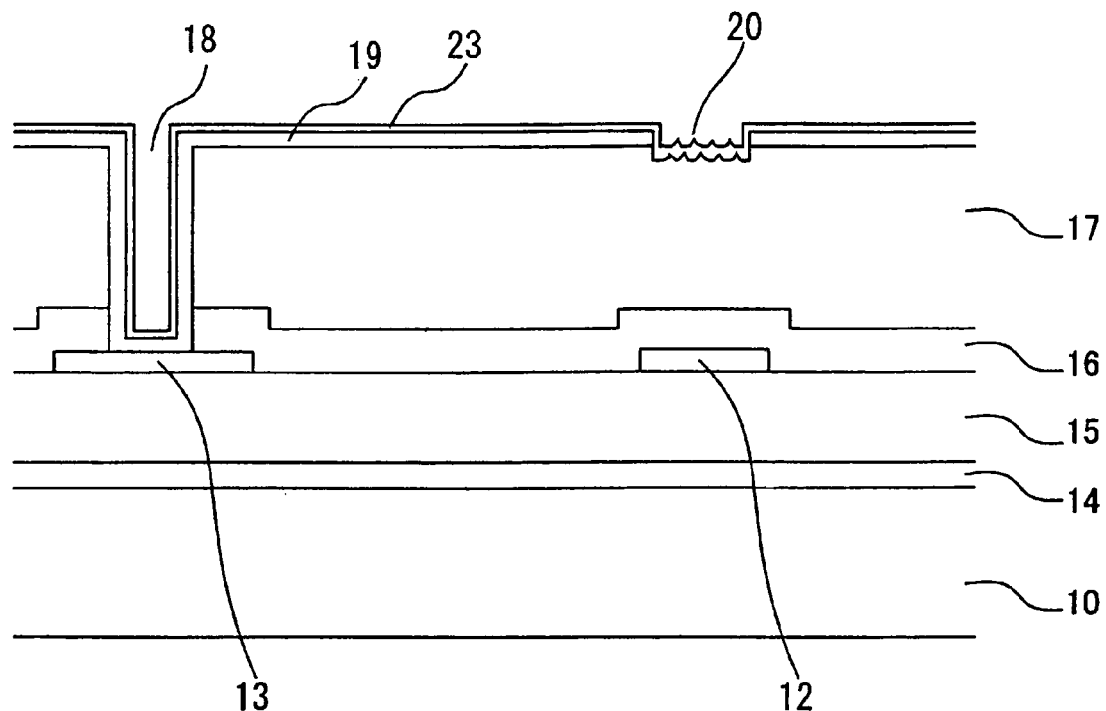
Figures 4, 5, 6, 7, 8:
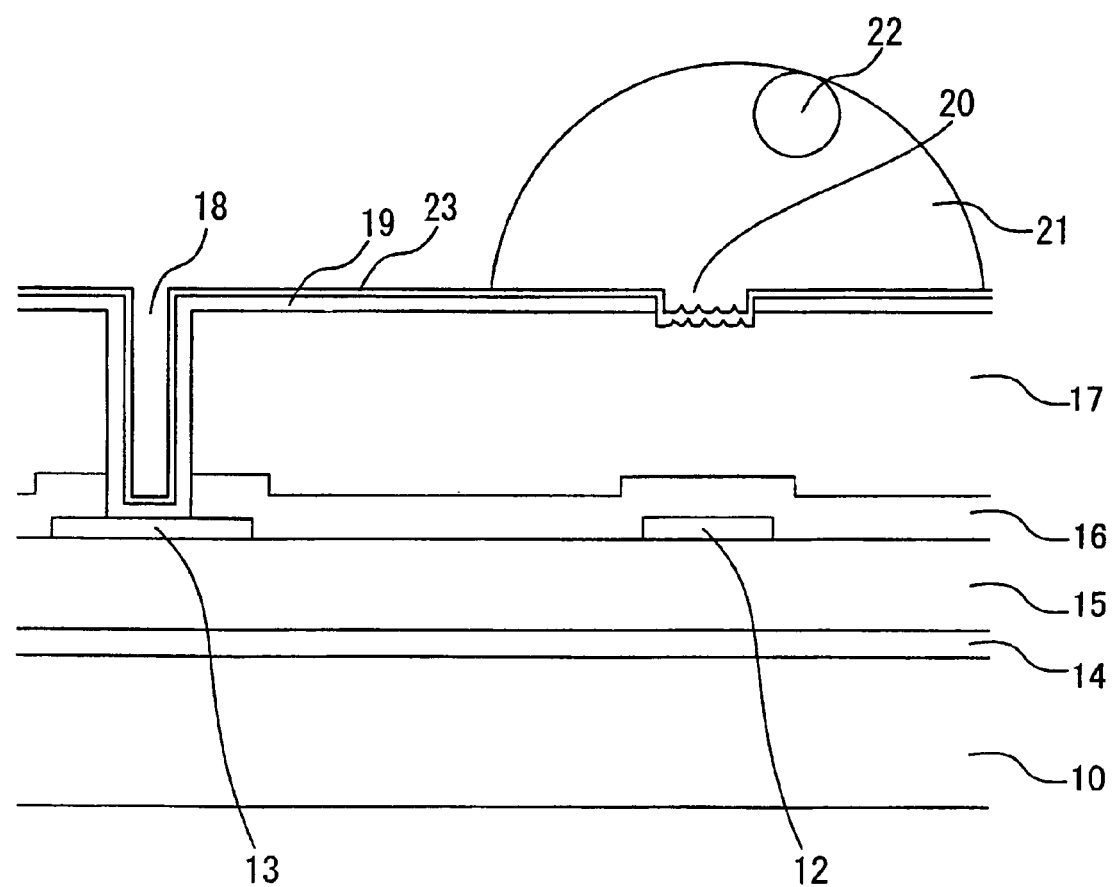
Figures 4, 5, 6, 7, 8, 9:
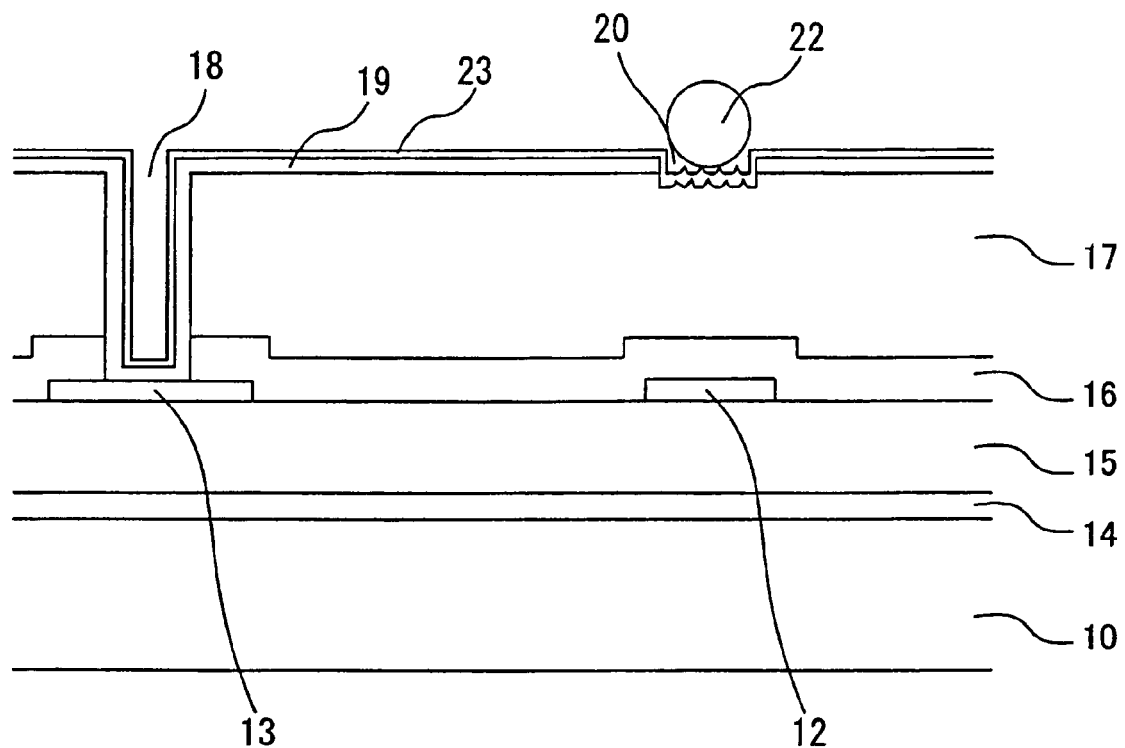
Figures 1, 5:
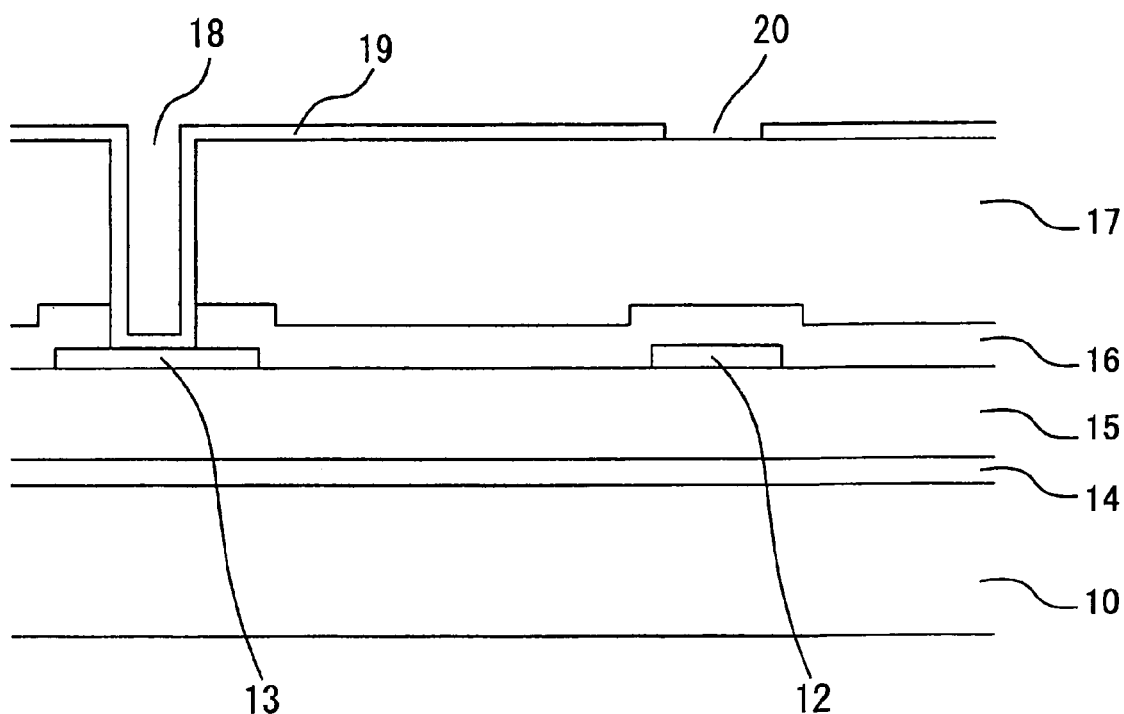
Figures 2, 5:
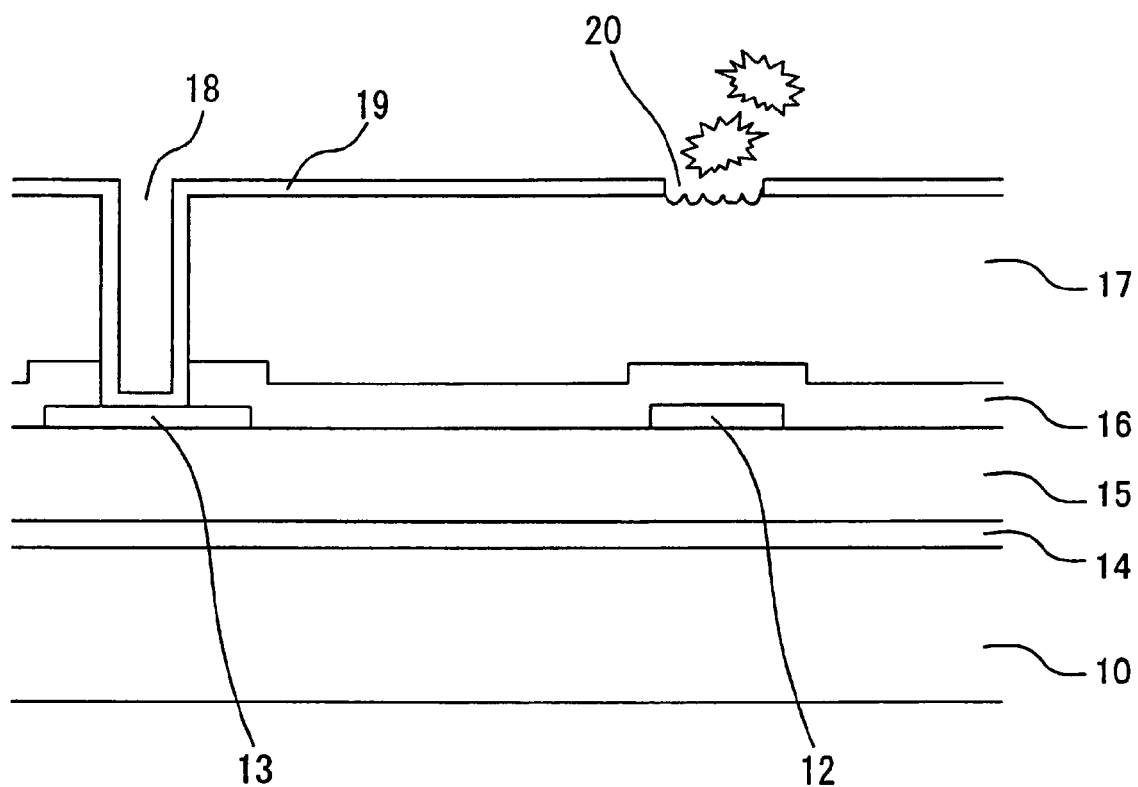
Figure 6:
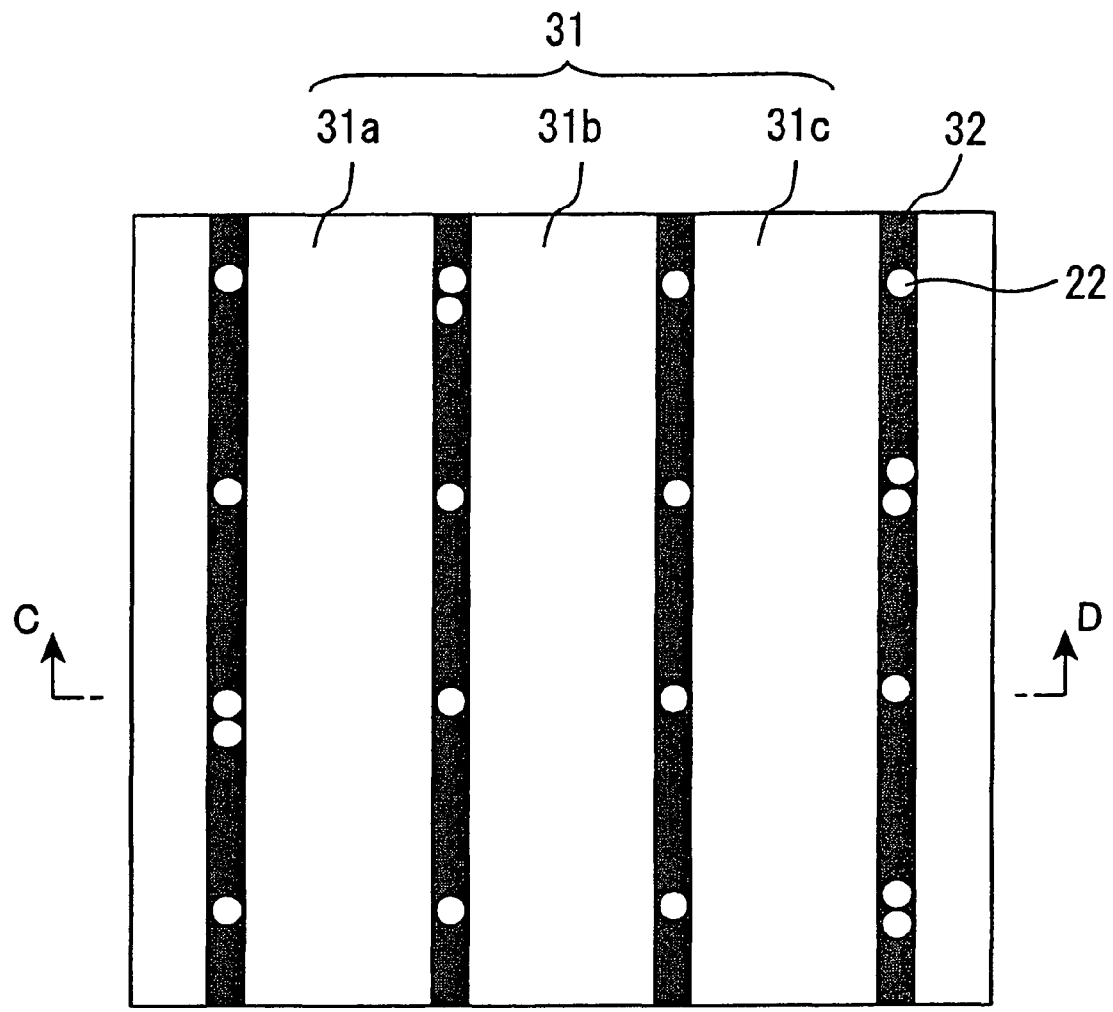
Figure 7:
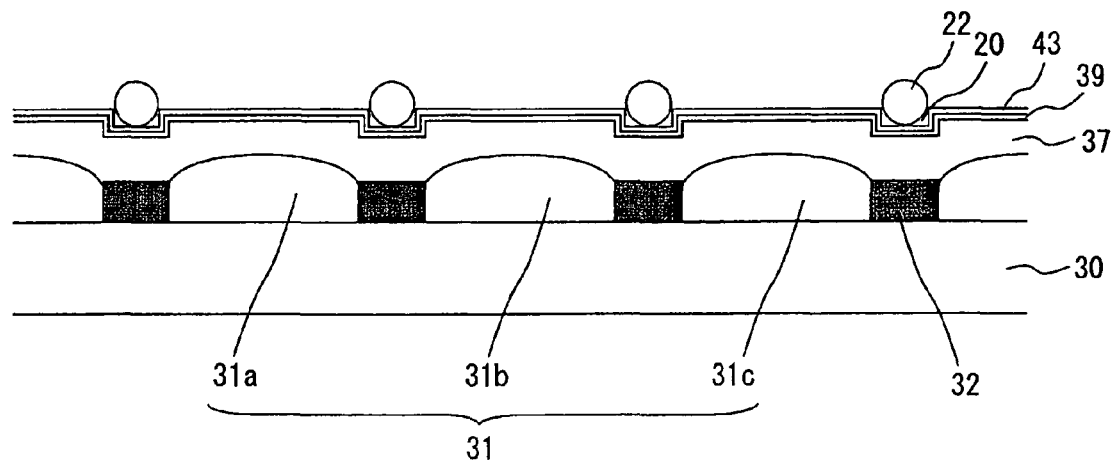
Figures 1, 8:
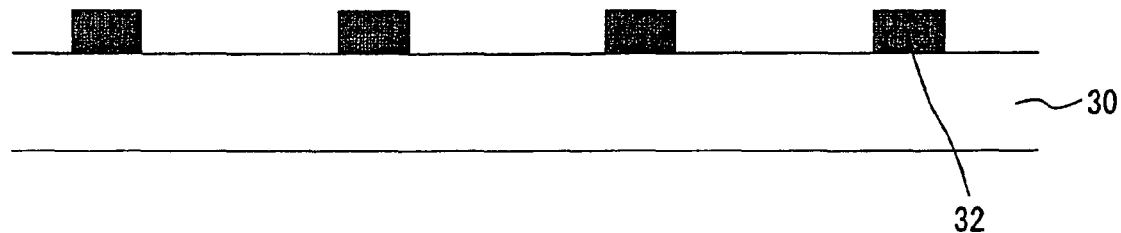
Figures 2, 8:
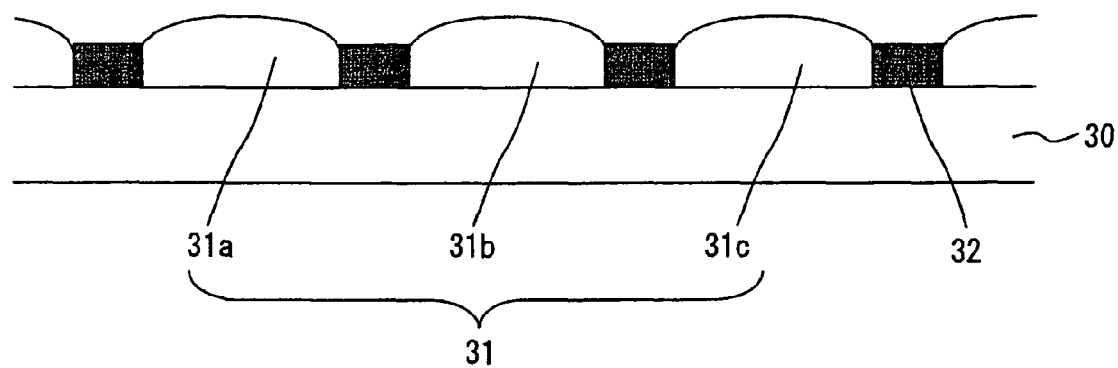
Figures 3, 8:
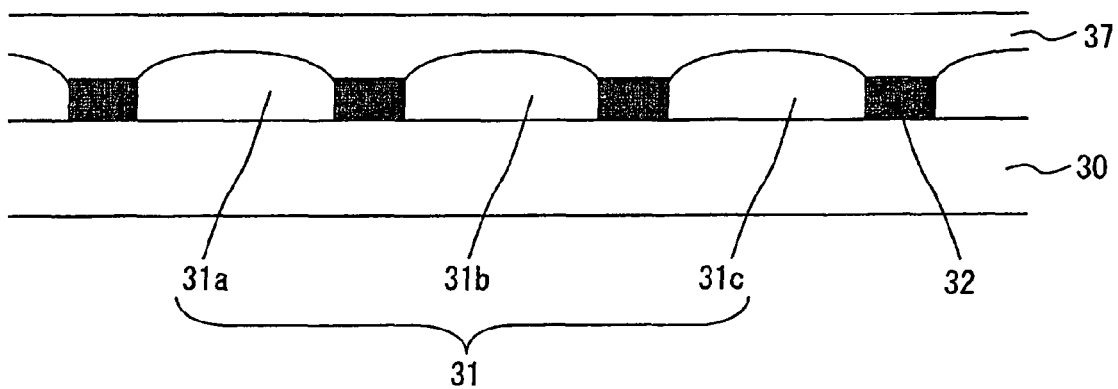
Figures 4, 8:
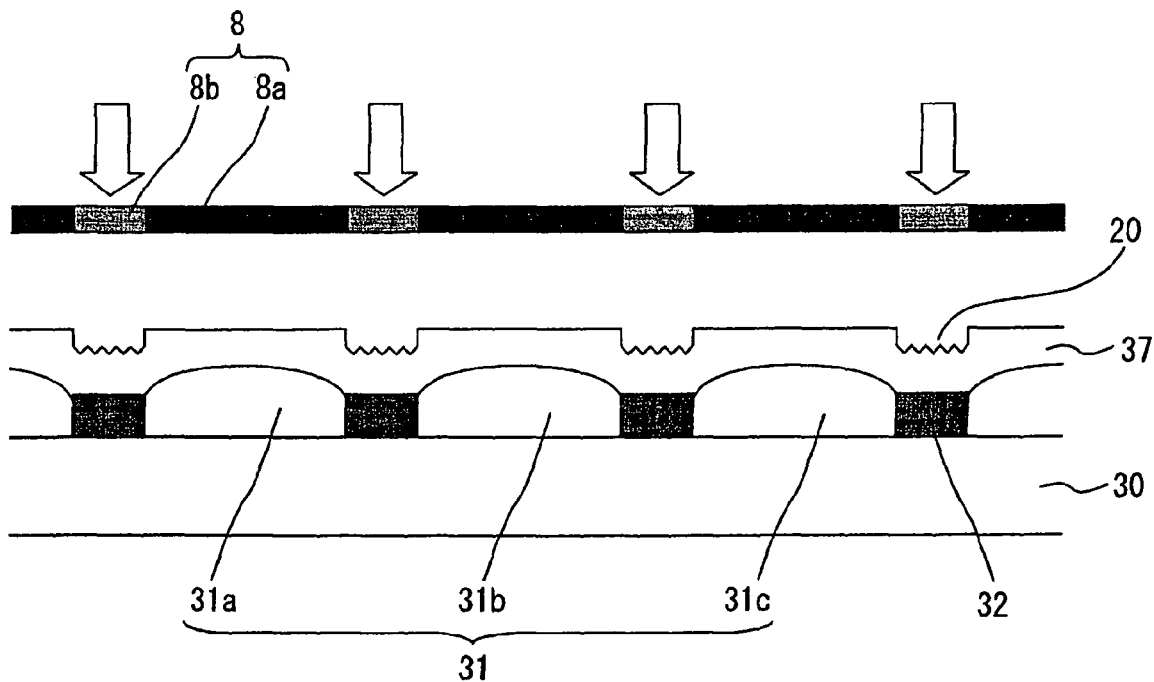
Figures 5, 8:
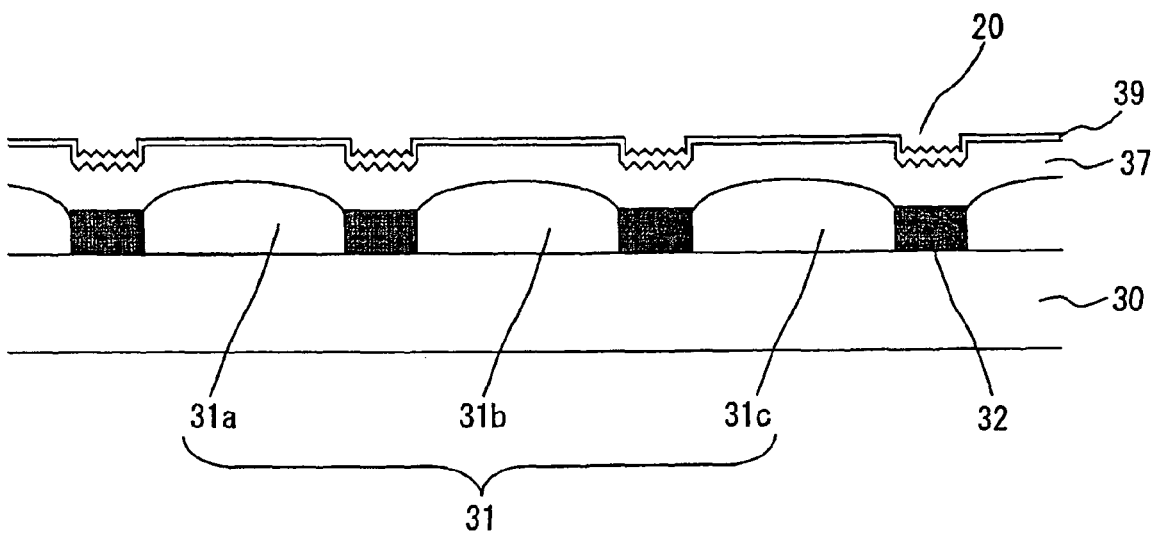
Figures 6, 8:
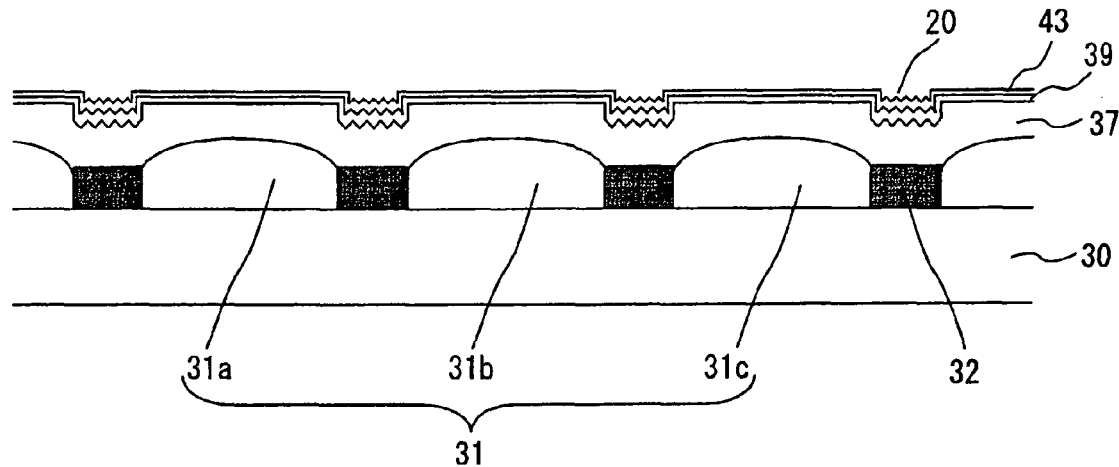
Figures 7, 8:
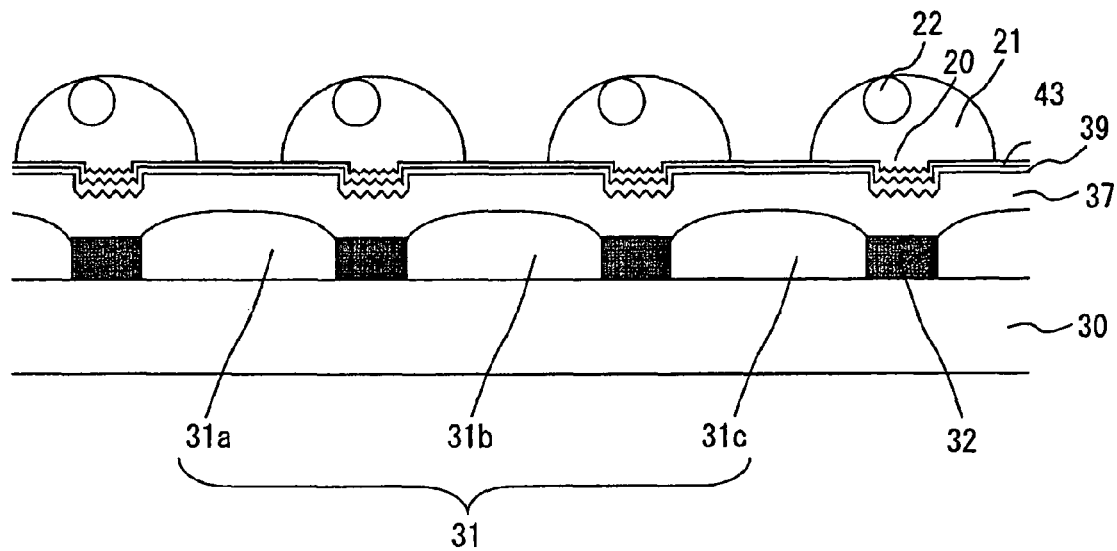
Figure 8:
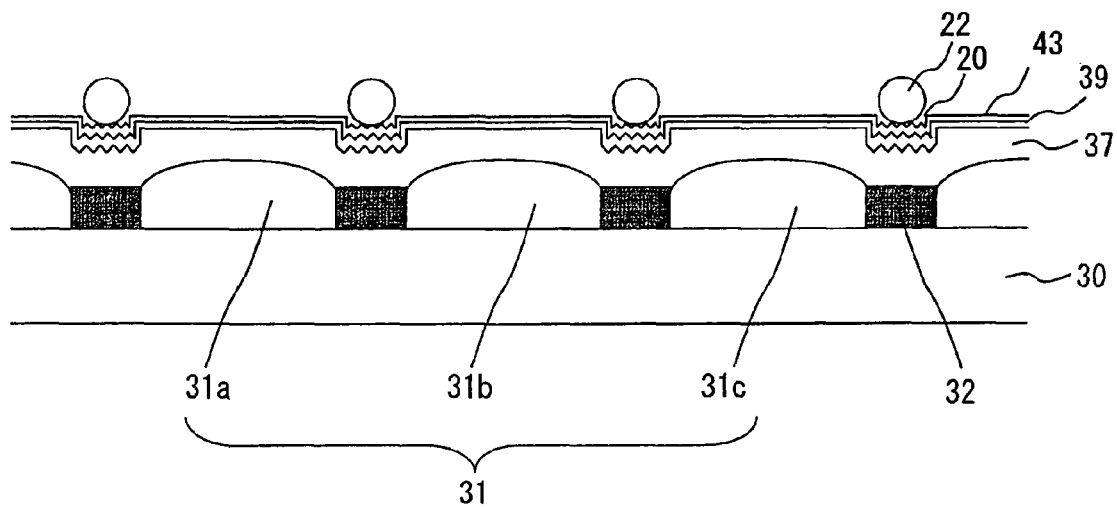
Figures 8, 9:
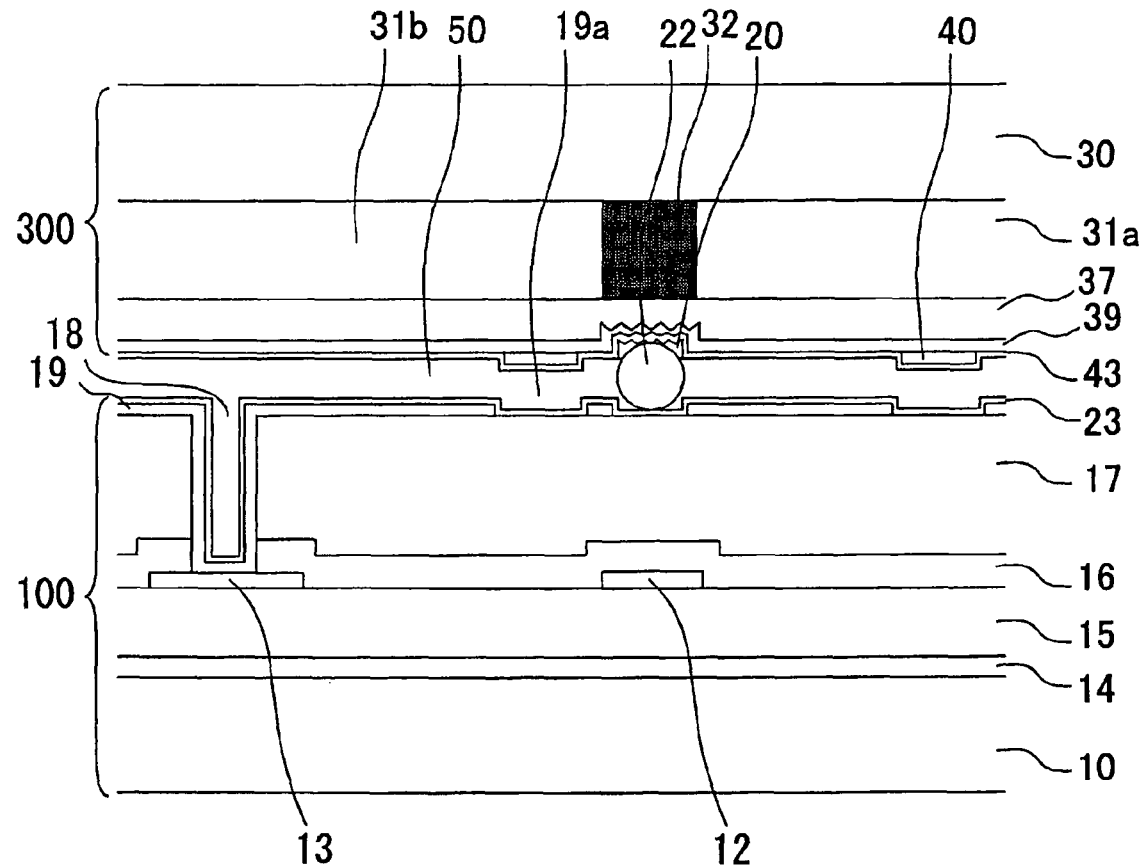
Figure 9:
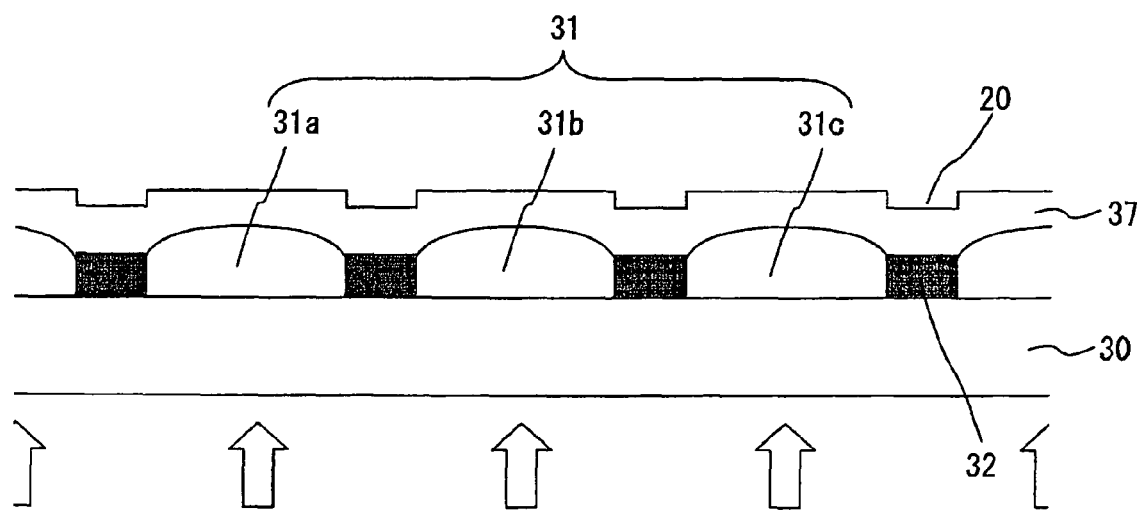

8: Mask
8a: Light-shielding portion of mask
8b: Half-exposure portion of mask
8c: Full-exposure portion of mask
9: Resist
10, 30: Glass substrate
11: Gate wiring
11a: Gate electrode
12: Source wiring
12a: Source electrode
13: Drain wiring
13a: Drain electrode
14: Storage capacitance (Cs) wiring
15: Gate insulating film
16: Protective film
17, 37: Resin interlayer insulating film
18: Contact hole
19: ITO (Indium Tin Oxide) pixel electrode
19': ITO film
19a: ITO slit for alignment control
20: Depression (Depression structure for spacer placement)
21: Dispersion medium of spacer-dispersed liquid
22: Spacer
23, 43: Alignment film
31: Colored layer
31a: First color layer
31b: Second color layer
31c: Third color layer
32: Black matrix
37': Overcoat layer
39: ITO (counter) electrode
40: Rib for alignment control
50: Liquid crystal
100: Thin film transistor array substrate
300: Color filter substrate

The invention claimed is:

1. A production method of a multilayer substrate comprising a wiring or a color layer, a resin interlayer film, and an electrode on a substrate in this order,
wherein the production method comprises the steps of:
forming a depression structure included in the resin interlayer film in a surface layer, the depression structure formed to have a roughened bottom surface that has greater roughness than the surface of the resin interlayer film surrounding the depression; and coating the depression structure with a liquid material including a spherical spacer using an ejection device, wherein the roughened bottom surface has greater roughness than the surface of the spacer.

2. The production method of the multilayer substrate according to claim 1, wherein the resin interlayer film includes a photosensitive resin, and the step of forming the depression structure is a step of irradiating a region where the depression structure is formed in the surface layer, with light through a mask provided with a mesh or a slit.

3. The production method of the multilayer substrate according to claim 1, wherein the ejection device is an ink jet device.

4. A production method of a multilayer substrate comprising a wiring or a color layer, a resin interlayer film, and an electrode on a substrate in this order, wherein the production method comprises:

a roughening step of roughening part or the whole of a surface of the resin interlayer film;

a step of forming a depression structure in the resin interlayer film, wherein the depression structure is formed to have a roughened bottom surface that has greater roughness than the surface of the resin interlayer film surrounding the depression; and a step of coating the depression structure with a liquid material including a spherical spacer using an ejection device, wherein the depression structure is formed such that the roughened bottom surface has greater roughness than the surface of the spacer.

5. The production method of the multilayer substrate according to claim 4, wherein the roughening step is performed by a plasma treatment.

6. The production method of the multilayer substrate according to claim 4, wherein the ejection device is an ink jet device.

7. A liquid crystal display panel comprising a multilayer substrate produced by the production method of the multilayer substrate of claim 1.

8. The liquid crystal display panel according to claim 7, wherein the liquid crystal display panel has a rib-shaped projection for alignment control formed on the multilayer substrate or a substrate opposite to the multilayer substrate.

9. A liquid crystal display panel comprising a multilayer substrate produced by the production method of the multilayer substrate of claim 4.

10. The liquid crystal display panel according to claim 9, wherein the liquid crystal display panel has a rib-shaped projection for alignment control formed on the multilayer substrate or a substrate opposite to the multilayer substrate.

11. A liquid crystal display device comprising a multilayer substrate produced by the production method of the multilayer substrate of claim 1.

12. A liquid crystal display device comprising a multilayer substrate produced by the production method of the multilayer substrate of claim 4.

13. The production method of the multilayer substrate according to claim 1, further comprising a step of disposing spacers within said depression structure.

14. The production method of the multilayer substrate according to claim 4, wherein the spacer is disposed within the depression structure.

* * * * *